US011736388B1

(12) United States Patent
Matthews et al.

(10) Patent No.: US 11,736,388 B1
(45) Date of Patent: *Aug. 22, 2023

(54) LOAD BALANCING PATH ASSIGNMENTS TECHNIQUES

(71) Applicant: Innovium, Inc., San Jose, CA (US)

(72) Inventors: William Brad Matthews, San Jose, CA (US); Puneet Agarwal, Cupertino, CA (US); Meg Pei Lin, Saratoga, CA (US); Rupa Budhia, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/367,330

(22) Filed: Jul. 3, 2021

Related U.S. Application Data

(63) Continuation of application No. 16/741,510, filed on Jan. 13, 2020, now Pat. No. 11,057,307, which is a
(Continued)

(51) Int. Cl.
*H04L 43/16* (2022.01)
*H04L 45/00* (2022.01)
(Continued)

(52) U.S. Cl.
CPC ............ *H04L 45/22* (2013.01); *H04L 43/16* (2013.01); *H04L 45/302* (2013.01);
(Continued)

(58) Field of Classification Search
CPC ..... H04L 47/21; H04L 43/16; H04L 47/6215; H04L 45/22; H04L 47/125
See application file for complete search history.

(56) References Cited

U.S. PATENT DOCUMENTS

| 5,805,602 A | 9/1998 | Cloutier et al. |
| 6,011,805 A | 1/2000 | Esteve et al. |

(Continued)

FOREIGN PATENT DOCUMENTS

CN 111183624 A 5/2020

OTHER PUBLICATIONS

United States Patent and Trademark Office, U.S. Appl. No. 16/575,343, Notice of Allowance dated Jan. 11, 2023.
(Continued)

*Primary Examiner* — Syed Ali
(74) *Attorney, Agent, or Firm* — Shield Intellectual Property PC; Kirk D. Wong

(57) ABSTRACT

Approaches, techniques, and mechanisms are disclosed for assigning paths to network packets. The path assignment techniques utilize path state information and/or other criteria to determine whether to route a packet along a primary candidate path selected for the packet, or one or more alternative candidate paths selected for the packet. According to an embodiment, network traffic is at least partially balanced by redistributing only a portion of the traffic that would have been assigned to a given primary path. Move-eligibility criteria are applied to traffic to determine whether a given packet is eligible for reassignment from a primary path to an alternative path. The move-eligibility criteria determine which portion of the network traffic to move and which portion to allow to proceed as normal. In an embodiment, the criteria and functions used to determine whether a packet is redistributable are adjusted over time based on path state information.

17 Claims, 13 Drawing Sheets

Related U.S. Application Data continuation of application No. 15/446,888, filed on Mar. 1, 2017, now Pat. No. 10,574,577.

(60) Provisional application No. 62/303,370, filed on Mar. 3, 2016, provisional application No. 62/302,697, filed on Mar. 2, 2016.

(51) Int. Cl.
| | |
|---|---|
| *H04L 45/302* | (2022.01) |
| *H04L 47/21* | (2022.01) |
| *H04L 47/125* | (2022.01) |
| *H04L 47/62* | (2022.01) |
| *H04L 45/7453* | (2022.01) |

(52) U.S. Cl.
CPC ............ *H04L 47/125* (2013.01); *H04L 47/21* (2013.01); *H04L 47/6215* (2013.01); *H04L 45/7453* (2013.01)

(56) References Cited

U.S. PATENT DOCUMENTS

| | | | |
|---|---|---|---|
| 6,373,399 B1 | 4/2002 | Johnson et al. | |
| 6,625,151 B1 | 9/2003 | Alowersson et al. | |
| 6,650,621 B1 | 11/2003 | Maki-Kullas | |
| 6,721,316 B1 | 4/2004 | Epps et al. | |
| 6,865,160 B1 | 3/2005 | Bare | |
| 6,977,930 B1 | 12/2005 | Epps et al. | |
| 7,149,187 B1 | 12/2006 | Jacobson et al. | |
| 7,295,562 B1 | 11/2007 | Acharya et al. | |
| 7,360,217 B2 | 4/2008 | Melvin et al. | |
| 7,382,244 B1* | 6/2008 | Donovan | H04L 41/22 340/541 |
| 7,813,348 B1 | 10/2010 | Gupta et al. | |
| 7,898,959 B1 | 3/2011 | Arad | |
| 8,004,990 B1 | 8/2011 | Callon | |
| 8,281,033 B1 | 10/2012 | Riordan et al. | |
| 8,588,242 B1 | 11/2013 | Izenberg et al. | |
| 9,489,401 B1* | 11/2016 | Garcia | G06F 16/5866 |
| 9,565,114 B1 | 2/2017 | Kabbani et al. | |
| 9,805,018 B1* | 10/2017 | Richfield | G06F 16/9535 |
| 9,979,624 B1 | 5/2018 | Volpe et al. | |
| 10,063,488 B2 | 8/2018 | Oran | |
| 10,313,255 B1 | 6/2019 | Matthews et al. | |
| 10,389,643 B1 | 8/2019 | Matthews et al. | |
| 10,505,849 B1 | 12/2019 | Iny et al. | |
| 10,713,079 B2 | 7/2020 | Muramatti et al. | |
| 10,721,187 B1 | 7/2020 | Goldman et al. | |
| 2002/0133617 A1 | 9/2002 | Davies | |
| 2003/0093567 A1 | 5/2003 | Lolayekar et al. | |
| 2003/0131122 A1 | 7/2003 | Kondo et al. | |
| 2003/0142685 A1 | 7/2003 | Bare | |
| 2003/0152076 A1 | 8/2003 | Lee et al. | |
| 2003/0154328 A1 | 8/2003 | Henderson et al. | |
| 2003/0210695 A1 | 11/2003 | Henrion | |
| 2003/0231646 A1 | 12/2003 | Chandra et al. | |
| 2004/0196790 A1 | 10/2004 | Balakrishnan et al. | |
| 2004/0218925 A1 | 11/2004 | Nahm | |
| 2005/0007959 A1 | 1/2005 | Tomonaga et al. | |
| 2005/0007961 A1 | 1/2005 | Scott et al. | |
| 2005/0013248 A1 | 1/2005 | Mekkittikul et al. | |
| 2005/0068970 A1 | 3/2005 | Srikrishna et al. | |
| 2005/0086363 A1 | 4/2005 | Ji | |
| 2005/0281279 A1 | 12/2005 | Dennison et al. | |
| 2006/0036821 A1 | 2/2006 | Frey et al. | |
| 2006/0067213 A1 | 3/2006 | Evans et al. | |
| 2006/0117099 A1 | 6/2006 | Mogul | |
| 2006/0218556 A1 | 9/2006 | Nemirovsky et al. | |
| 2006/0274760 A1 | 12/2006 | Loher | |
| 2007/0028003 A1 | 2/2007 | Rudkin | |
| 2007/0091802 A1 | 4/2007 | Pan et al. | |
| 2007/0195778 A1 | 8/2007 | Tatar et al. | |
| 2007/0280117 A1 | 12/2007 | Katz et al. | |
| 2008/0112343 A1 | 5/2008 | Oleszczuk | |
| 2008/0212613 A1 | 9/2008 | Perkinson et al. | |
| 2008/0259800 A1 | 10/2008 | Clark et al. | |
| 2009/0010248 A1 | 1/2009 | Kanai | |
| 2009/0028045 A1 | 1/2009 | Stellenberg et al. | |
| 2009/0063431 A1* | 3/2009 | Erol | G06V 10/993 |
| 2009/0075668 A1 | 3/2009 | Rao | |
| 2009/0109858 A1 | 4/2009 | Yamasaki et al. | |
| 2009/0190591 A1 | 7/2009 | Sankaran | |
| 2009/0304014 A1 | 12/2009 | Evans et al. | |
| 2010/0046524 A1 | 2/2010 | Rune et al. | |
| 2010/0091782 A1 | 4/2010 | Hiscock | |
| 2010/0309783 A1 | 12/2010 | Howe | |
| 2011/0051602 A1 | 3/2011 | Matthews et al. | |
| 2011/0280126 A1 | 11/2011 | Fefer et al. | |
| 2012/0008496 A1 | 1/2012 | Saavedra | |
| 2012/0063451 A1 | 3/2012 | Keesara et al. | |
| 2012/0201241 A1 | 8/2012 | Subramanian et al. | |
| 2012/0236860 A1 | 9/2012 | Kompella et al. | |
| 2012/0254931 A1* | 10/2012 | Oztaskent | H04N 21/8586 725/112 |
| 2013/0259037 A1 | 10/2013 | Natarajan et al. | |
| 2013/0329577 A1 | 12/2013 | Suzuki et al. | |
| 2014/0092736 A1 | 4/2014 | Baillargeon | |
| 2014/0105025 A1 | 4/2014 | Lavian et al. | |
| 2014/0126396 A1 | 5/2014 | Matthews et al. | |
| 2014/0126573 A1 | 5/2014 | Matthews et al. | |
| 2014/0169189 A1 | 6/2014 | Kalkunte | |
| 2014/0219087 A1 | 8/2014 | Matthews et al. | |
| 2014/0247740 A1 | 9/2014 | Koo | |
| 2014/0369426 A1* | 12/2014 | Li | H04N 19/186 375/240.29 |
| 2015/0016258 A1 | 1/2015 | Okner et al. | |
| 2015/0016266 A1 | 1/2015 | Dumitrescu et al. | |
| 2015/0043330 A1 | 2/2015 | Hu et al. | |
| 2015/0124608 A1 | 5/2015 | Agarwal et al. | |
| 2015/0139540 A1* | 5/2015 | Moraleda | G06V 10/96 382/164 |
| 2015/0295827 A1 | 10/2015 | Zhu et al. | |
| 2016/0044695 A1 | 2/2016 | Gunner | |
| 2016/0072717 A1 | 3/2016 | Ansari et al. | |
| 2016/0087894 A1 | 3/2016 | Chen et al. | |
| 2016/0134915 A1 | 5/2016 | Oran | |
| 2016/0164792 A1 | 6/2016 | Oran | |
| 2016/0254992 A1 | 9/2016 | Torvi et al. | |
| 2016/0261500 A1 | 9/2016 | Revah et al. | |
| 2016/0269284 A1 | 9/2016 | Cheng et al. | |
| 2016/0308769 A1 | 10/2016 | Versteeg et al. | |
| 2016/0373199 A1 | 12/2016 | Olofsson et al. | |
| 2017/0048147 A1 | 2/2017 | Vaidya | |
| 2017/0111264 A1 | 4/2017 | Shankarappa et al. | |
| 2017/0126547 A1 | 5/2017 | Wood et al. | |
| 2017/0134282 A1 | 5/2017 | Agarwal et al. | |
| 2017/0149678 A1 | 5/2017 | Dumitrescu et al. | |
| 2017/0279728 A1 | 9/2017 | Oran | |
| 2018/0091388 A1 | 3/2018 | Levy et al. | |
| 2018/0159800 A1 | 6/2018 | Tietz et al. | |
| 2018/0356837 A1 | 12/2018 | Lisewski et al. | |
| 2019/0089644 A1 | 3/2019 | Shpiner et al. | |
| 2020/0007454 A1 | 1/2020 | Frink | |
| 2020/0053026 A1 | 2/2020 | Rangachari et al. | |
| 2020/0106710 A1 | 4/2020 | Ryoo et al. | |
| 2020/0136973 A1 | 4/2020 | Rahman et al. | |
| 2020/0249979 A1 | 8/2020 | Muramatti et al. | |
| 2020/0274811 A1 | 8/2020 | Srivastava et al. | |
| 2021/0021545 A1 | 1/2021 | Srivastava et al. | |
| 2021/0243094 A1 | 8/2021 | Holness et al. | |
| 2021/0409313 A1 | 12/2021 | Iorga et al. | |
| 2022/0045972 A1 | 2/2022 | Aibester et al. | |
| 2022/0150171 A1 | 5/2022 | Matthews et al. | |

OTHER PUBLICATIONS

United States Patent and Trademark Office, U.S. Appl. No. 17/091,904, Notice of Allowance dated Nov. 17, 2022.
United States Patent and Trademark Office, U.S. Appl. No. 17/352,583, Non-Final Office Action dated Dec. 22, 2022.
U.S. Appl. No. 16/527,278, filed Jul. 31, 2019, Matthews.
U.S. Appl. No. 16/575,343, filed Sep. 18, 2019, Matthews.

(56) References Cited

OTHER PUBLICATIONS

Sinha et al. "Harnessing TCP's Burstiness with Flowlet Switching." (2004).
United States Patent and Trademark Office, U.S. Appl. No. 15/407,149, Non-Final Office Action dated Aug. 28, 2018.
United States Patent and Trademark Office, U.S. Appl. No. 15/407,149, Notice of Allowance dated Jan. 25, 2019.
United States Patent and Trademark Office, U.S. Appl. No. 15/407,156, Notice of Allowance dated Jan. 24, 2019.
United States Patent and Trademark Office, U.S. Appl. No. 15/407,159, Advisory Action dated Nov. 1, 2019.
United States Patent and Trademark Office, U.S. Appl. No. 15/407,159, Final Office Action dated Aug. 13, 2019.
United States Patent and Trademark Office, U.S. Appl. No. 15/407,159, Non-Final Office Action dated Jan. 4, 2019.
United States Patent and Trademark Office, U.S. Appl. No. 15/407,159, Notice of Allowance dated Mar. 25, 2020.
United States Patent and Trademark Office, U.S. Appl. No. 15/410,607, Final Office Action dated Dec. 18, 2018.
United States Patent and Trademark Office, U.S. Appl. No. 15/410,607, Non-Final Office Action dated May 17, 2018.
United States Patent and Trademark Office, U.S. Appl. No. 15/410,607, Notice of Allowance dated Apr. 3, 2019.
United States Patent and Trademark Office, U.S. Appl. No. 15/410,644, Final Office Action dated Oct. 11, 2018.
United States Patent and Trademark Office, U.S. Appl. No. 15/410,644, Non-Final Office Action dated May 3, 2018.
United States Patent and Trademark Office, U.S. Appl. No. 15/410,644, Notice of Allowance dated Jan. 28, 2019.
United States Patent and Trademark Office, U.S. Appl. No. 15/410,651, Final Office Action dated Oct. 11, 2018.
United States Patent and Trademark Office, U.S. Appl. No. 15/410,651, Final Office Action dated Jun. 6, 2019.
United States Patent and Trademark Office, U.S. Appl. No. 15/410,651, Non-Final Office Action dated May 15, 2018.
United States Patent and Trademark Office, U.S. Appl. No. 15/410,651, Non-Final Office Action dated Feb. 15, 2019.
United States Patent and Trademark Office, U.S. Appl. No. 15/410,651, Notice of Allowance dated Sep. 24, 2019.
United States Patent and Trademark Office, U.S. Appl. No. 15/410,686, Final Office Action dated Nov. 8, 2018.
United States Patent and Trademark Office, U.S. Appl. No. 15/410,686, Non-Final Office Action dated May 9, 2018.
United States Patent and Trademark Office, U.S. Appl. No. 15/410,686, Notice Of Allowance dated Apr. 9, 2019.
United States Patent and Trademark Office, U.S. Appl. No. 15/446,888, Advisory Action dated Mar. 15, 2019.
United States Patent and Trademark Office, U.S. Appl. No. 15/446,888, Final Office Action dated Nov. 23, 2018.
United States Patent and Trademark Office, U.S. Appl. No. 15/446,888, Non-Final Office Action dated May 10, 2018.
United States Patent and Trademark Office, U.S. Appl. No. 15/446,888, Notice of Allowance dated Sep. 24, 2019.
United States Patent and Trademark Office, U.S. Appl. No. 15/446,894, Non-Final Office Action dated Jul. 27, 2018.
United States Patent and Trademark Office, U.S. Appl. No. 15/446,894, Notice of Allowance dated Feb. 19, 2019.
United States Patent and Trademark Office, U.S. Appl. No. 15/446,901, Advisory Action dated Mar. 28, 2019.
United States Patent and Trademark Office, U.S. Appl. No. 15/446,901, Final Office Action dated Jan. 15, 2019.
United States Patent and Trademark Office, U.S. Appl. No. 15/446,901, Non-Final Office Action dated Aug. 29, 2018.
United States Patent and Trademark Office, U.S. Appl. No. 15/446,901, Notice of Allowance dated May 28, 2019.
United States Patent and Trademark Office, U.S. Appl. No. 16/288,165, Non-Final Office Action dated Aug. 22, 2019.
United States Patent and Trademark Office, U.S. Appl. No. 16/288,165, Notice of Allowance dated Jan. 27, 2020.
United States Patent and Trademark Office, U.S. Appl. No. 16/527,278, Non-Final Office Action dated Oct. 13, 2020.
United States Patent and Trademark Office, U.S. Appl. No. 16/527,278, Notice of Allowance dated Feb. 19, 2021.
United States Patent and Trademark Office, U.S. Appl. No. 16/575,343, Advisory Action dated Jun. 29, 2021.
United States Patent and Trademark Office, U.S. Appl. No. 16/575,343, Final Office Action dated Mar. 31, 2021.
United States Patent and Trademark Office, U.S. Appl. No. 16/575,343, Non-Final Office Action dated Sep. 30, 2020.
United States Patent and Trademark Office, U.S. Appl. No. 16/595,127, Non-Final Office Action dated Oct. 16, 2020.
United States Patent and Trademark Office, U.S. Appl. No. 16/595,127, Notice of Allowance dated Mar. 23, 2021.
United States Patent and Trademark Office, U.S. Appl. No. 16/741,510, Notice of Allowance dated Feb. 18, 2021.
United States Patent and Trademark Office, U.S. Appl. No. 16/575,343, Advisory Action dated Jul. 25, 2022.
United States Patent and Trademark Office, U.S. Appl. No. 16/575,343, Final Office Action dated May 10, 2022.
United States Patent and Trademark Office, U.S. Appl. No. 16/575,343, Non-Final Office Action dated Sep. 6, 2022.
United States Patent and Trademark Office, U.S. Appl. No. 17/091,904, Non-Final Office Action dated Apr. 28, 2022.
United States Patent and Trademark Office, U.S. Appl. No. 17/091,916, Restriction Requirement dated Sep. 22, 2022.
World Intellectual Property Organization, Application No. PCT/US22/20087, International Search Report dated Jul. 19, 2022.
United States Patent and Trademark Office, U.S. Appl. No. 16/575,343, Non-Final Office Action dated Sep. 28, 2021.
United States Patent and Trademark Office, U.S. Appl. No. 17/091,916, Non-Final Office Action dated Mar. 15, 2023.
United States Patent and Trademark Office, U.S. Appl. No. 17/091,916, Notice of Allowance dated May 26, 2023.
United States Patent and Trademark Office, U.S. Appl. No. 17/352,583, Final Office Action dated May 15, 2023.
United States Patent and Trademark Office, U.S. Appl. No. 17/385,503, Non-Final Office Action dated Apr. 7, 2023.

* cited by examiner

LOAD BALANCING PATH ASSIGNMENTS TECHNIQUES

PRIORITY CLAIM

This application claims benefit under 35 U.S.C § 120 as a Continuation of U.S. patent application Ser. No. 16/741,510, filed Jan. 13, 2020, which is a Continuation of U.S. patent application Ser. No. 15/446,888, filed Mar. 1, 2017, which claims benefit under 35 U.S.C. § 119(e) of Provisional Application No. 62/302,697, filed Mar. 2, 2016, and Provisional Application No. 62/303,370, filed Mar. 3, 2016, the entire contents of each of which are hereby incorporated by reference as if fully set forth herein. Applicant hereby rescinds any disclaimer of claim scope in the parent applications or the prosecution history thereof and advise the USPTO that the claims in this application may be broader than any claim in the parent applications.

CROSS-REFERENCE TO RELATED APPLICATIONS

This application is related to U.S. patent application Ser. No. 15/446,894, filed on Mar. 1, 2017, entitled "Sliding Windows," by Matthews, et al., the entire contents of which are hereby incorporated by reference for all purposes as if fully set forth herein.

This application is related to U.S. patent application Ser. No. 15/446,901, filed on Mar. 1, 2017, entitled "Redistribution Policy Engine," by Matthews, et al., the entire contents of which are hereby incorporated by reference for all purposes as if fully set forth herein.

This application is related to U.S. patent application Ser. No. 15/410,607, filed on Jan. 19, 2017, entitled "Dynamic Weighted Cost Multipathing," by Matthews, et al., the entire contents of which are hereby incorporated by reference for all purposes as if fully set forth herein.

TECHNICAL FIELD

Embodiments relate generally to computer networking, and, more specifically, to techniques for improving network performance based on network state information and/or other information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network or data network is a set of computing components interconnected by communication links. Each computing component may be a separate computing device, such as, without limitation, a hub, switch, bridge, router, server, gateway, or personal computer, or a component thereof. Each computing component is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocol, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes or "hops." The node may identify these paths in a variety of manners. For instance, the paths may be specified to the node in advance, and/or the node may identify the paths by analyzing a topological map, such as the node may build over time through observations of certain types of packets from other nodes in the network.

Each path is mapped to one or more destination nodes. For instance, a path may be mapped to a grouping of nodes known as a subnet, wherein all nodes in the grouping share a certain address prefix. Or a path may be mapped to individual destination nodes. Each path is further associated with an outbound port of the node, through which packets routed through the path are sent out. Hence, a path may be viewed in one sense as a mapping of one or more destination nodes to a specific outbound port of a node.

In complex networks, there may be any number of different paths between two nodes. Some of these paths may include different nodes, while other paths may include the same nodes but involve at least some different ports and/or communication links between those nodes. In some systems, a node may also consider certain internal components within the node to be part of a path (e.g. a specific component intended to post-process a packet, take traffic control actions with respect to a packet, or mark a packet with a special label or flag). The existence of multiple paths between two nodes may necessitate techniques for a node to select which path to send a packet through in order to reach the other node.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
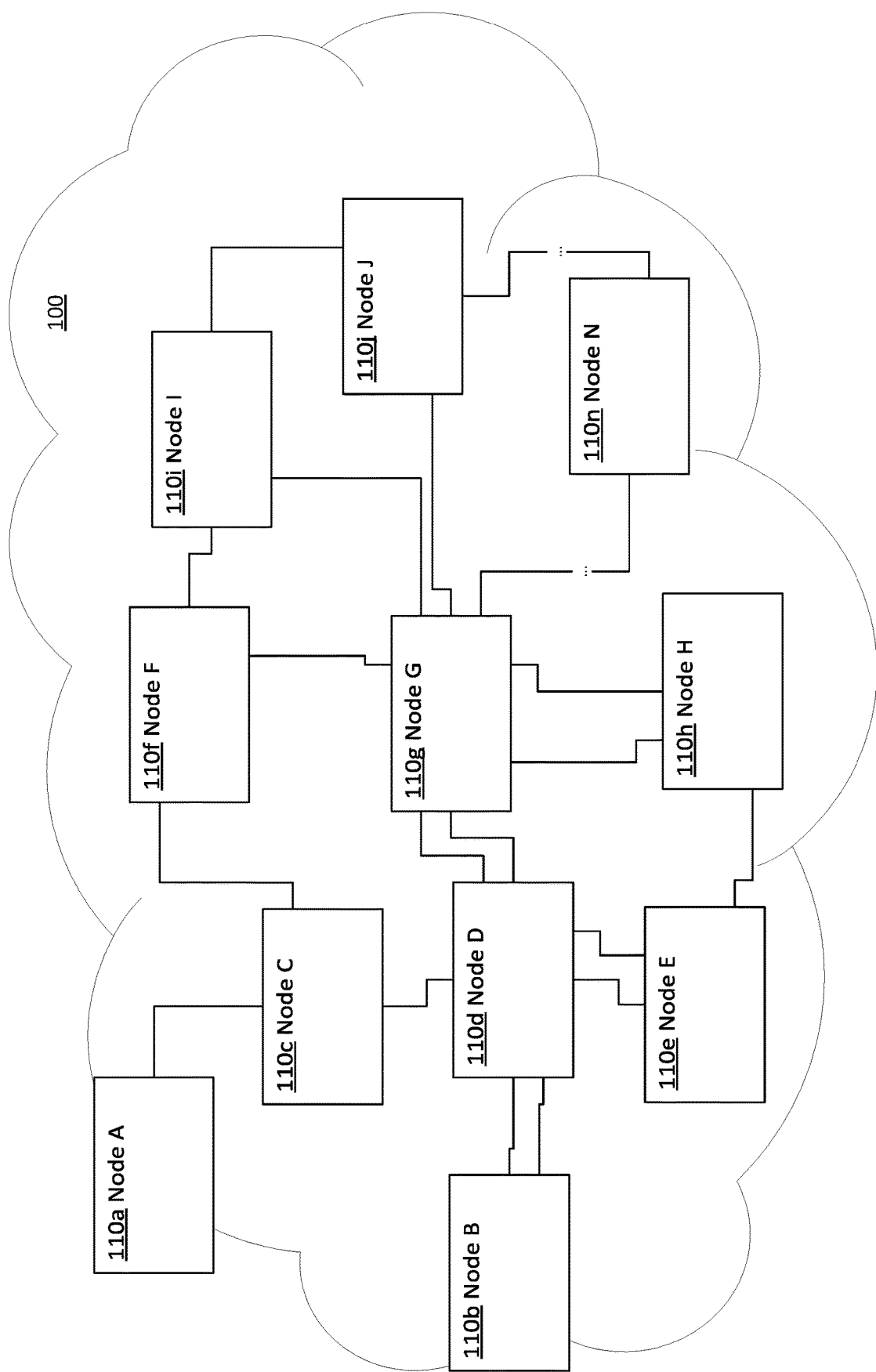
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

| | |
|---|---|
| 1.0. | General Overview |
| 2.0. | Structural Overview |
| | 2.1. Network Packets |
| | 2.2. Network Paths |
| | 2.3. Network Device |
| | 2.4. Ports |
| | 2.5. Traffic Management |
| | 2.6. Forwarding Logic |
| | 2.7. Performance Monitoring Subsystems |
| | 2.8. Path Selection and Management |
| | 2.9. Miscellaneous |
| 3.0. | Path Assignment |
| | 3.1. Path Selection Groups |
| | 3.2. Selecting a Candidate Path from a Group |
| | 3.3. Secondary Paths |
| | 3.4. Assigning Non-Primary Paths |
| | 3.5. Sliding Windows |
| | 3.6. Learning-Based Adaptive Move-eligibility |
| | 3.7. Serial Versus Parallel Selection |
| | 3.8. Example Architectures |
| 4.0. | Redistribution Policy Engine |
| | 4.1. Metrics |
| | 4.2. Redistribution States |
| | 4.3. Redistributable Values |
| | 4.4. Redistribution Buckets |
| | 4.5. Redistribution Debugging |
| | 4.6. Miscellaneous |
| 5.0. | Example Process Flows |
| | 5.1. Path Assignment |
| | 5.2. Determining Move-Eligibility |
| | 5.3. Selecting a Move-Eligibility Hash Function |
| | 5.4. Example Use of a Redistribution Policy Engine |
| 6.0. | Example Embodiments |
| 7.0. | Implementation Mechanism-Hardware Overview |
| 8.0. | Extensions and Alternatives |

1.0. General Overview

Approaches, techniques, and mechanisms are disclosed for assigning paths along which to send packets to destinations, according to an embodiment. Among other aspects, the techniques permit better load balancing in complex network topologies, such as in data centers or other contexts.

According to an embodiment, the path assignment techniques utilize path state information to determine whether to route a packet along a primary path selected for the packet, or one or more alternative paths selected for the packet. State information is maintained for at least a primary group of paths. Using primary path selection logic, a particular one of the paths in the primary group (i.e. a "primary path") is selected for a given packet to the destination. The given packet is usually assigned to (i.e. routed along) the primary path. However, when the state of that path does not meet some threshold requirement(s), the given packet may instead be assigned to an alternative path. This alternative path may be, in some embodiments, and when certain conditions are met, a secondary path selected from the primary group using secondary selection logic. In some embodiments, this alternative path may alternatively be, when certain conditions are met, an alternate path selected from one or more alternate groups of paths using alternate selection logic.

According to an embodiment, network traffic is at least partially balanced by redistributing only a portion of the traffic that would have been assigned to a given primary path. Move-eligibility criteria are evaluated against traffic using, for example, one or more move-eligibility functions, to determine whether a given packet is eligible for reassignment from a primary path to an alternative path. Hence, the move-eligibility criteria determine which portion of the network traffic (i.e. which packets or traffic flows) to move and which portion to allow to proceed as normal. When a packet is determined to be eligible for reassignment, an alternative path may be chosen for the packet using any technique, including the techniques described herein as well as any other suitable techniques.

According to an embodiment, move-eligibility may be determined using a hash function of information within a packet. The hash function may be the same as or different from any hash functions used to select the primary and/or alternative paths. The hash value output from the hash function is then compared to a range or other set of values that have been designated as being "move-eligible." If the hash value is in the set of designated move-eligible values, the packet may be redistributed to an alternative path, if needed, for path quality, load-balancing, or other reasons. The set of move-eligible values may change over time. For example, additional move-eligible values may be added if the quality of the most optimal paths to a destination is determined to be degraded. The move-eligible values may, in an embodiment, be designated on a per-destination or per-group basis. To reduce packet re-ordering and/or other issues, in an embodiment, once adjusted, the move-eligible values should not change for at least a specific interval of time referred to herein as an "epoch."

According to an embodiment, the hash function used to determine move-eligibility may change over time. The currently active hash function may be selected from multiple predefined hash functions. In an embodiment, to reduce packet reordering and/or other issues, once a hash function has been selected, the same hash function should be utilized to determine move-eligibility for all packets, or for at least all packets belonging to a particular group, for at least a specific interval of time (i.e. an epoch). Once that interval of time has elapsed, path quality statistics are evaluated to quantify some aspect of the overall quality state of the paths to the destination(s) for which the hash function were used to determine move-eligibility. If the hash function did not achieve desirable results, in that the overall quality state was relatively poor while the hash function was used, a new hash function may be selected. In an embodiment, this new hash function may be one that was previously determined to produce a higher overall quality state. In an embodiment, to "learn" how other hash functions perform, alternative hash functions may be selected at random intervals, in accordance with an exploration frequency, which frequency may decrease over time as more and more statistics are collected.

According to an embodiment, a redistribution policy engine is utilized to determine when to redistribute traffic. Generally, the redistribution policy engine determines: (a) a percentage or other amount of traffic to be redistributed, (b) group(s) of traffic flows that compose that percentage, and (c) whether a given message belongs to one of these group(s) of flows. In an embodiment, the redistribution includes various components to monitor path metrics and determine redistribution states based thereon. In an embodiment, the redistribution policy engine further includes a debugging unit, configurable to perform various actions when traffic is redistributed.

In other aspects, the inventive subject matter encompasses computer apparatuses and computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented using application-specific integrated circuits (ASICs) or field programmable gate arrays (FPGAs). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Network Packets

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment) to a second node 110 over a path that includes an intermediate node 110. This data unit 110 will be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g. packets or frames) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the node may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the packet, a label to attach the packet, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, in which context the described techniques have particular advantages. It will be recognized, however, that these techniques may also be applied to realize advantages in routing other types of data units conforming to other protocols and/or at other communication layers within a network. Thus, unless otherwise stated or apparent, the term "packet" as used herein should be understood to refer to any type of data structure communicated across a network, including packets as well as segments, cells, data frames, datagrams, and so forth.

2.2. Network Paths

Any node in the depicted network 100 may communicate with any other node in the network 100 by sending packets through a series of nodes 110 and links, referred to as a path. For example, Node B (110b) may send packets to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g. which egress port it should send the packet out on). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110. In this manner, the actual path of a packet is product of each node 110 along the path making routing decisions about how best to move the packet along to the destination node 110 identified by the packet.

In an embodiment, a node 110 may be configured to exercise greater control over a path. The node 110 may, for instance, be configured to include data within the packet that indicates, by a label or identifier, some aspect of the path that should be selected for the path. Other nodes 110 are configured to honor this information. Or, a node 110 may be configured to encapsulate a packet in a tunnel between two nodes. The packet is wrapped with a tunnel header that specifies a different destination than the destination of the packet. The packet is first directed to this tunnel destination, at which point the tunnel header is removed, and the packet continues on to the originally specified destination.

Moreover, there may be more than one link between two nodes 110. For instance, there is more than one link between Node B and Node D. Each different link between two nodes 110 may be considered a different path between those two nodes 110.

Some of the paths between two nodes 110 are clearly not optimal. For instance, a path that from Node B to Node D to Node C to Node F to Node I to Node J to Node N to Node G to Node H is likely less optimal than any of the paths mentioned thus far. A node may thus be configured not to make routing decisions that would select such paths. On the other hand, many other paths may be equally optimal, depending on the state of the network 100. To optimize use of network 100, nodes 110 may be configured to distribute, or "load-balance," traffic between a number of paths so as to reduce congestion at any one node or along any one path. This distribution may be equal, or weighted. Moreover, in accordance with some embodiments, the distribution may change over time in accordance with changes in the state of nodes 110 and/or paths.

In some embodiments, some or all of nodes 110 may be configured to contribute to various processes for collecting state information associated with nodes 110 and/or paths. Some or all of nodes 110 may be configured, for example, to selectively annotate packets with state information as they traverse the network 100. Some or all of nodes 110 may also or instead be configured to selectively reflect certain annotated packets back down a path, in reverse of the direction they were sent, to provide upstream feedback regarding the states of nodes 110 and/or paths. Some or all of nodes 110 may also or instead be configured to collect state information from such annotated packets. Some or all of nodes 110 may also or instead be configured to change various aspects of network 100 based on collected information, such as changing traffic flow control policies, rerouting traffic, rebooting nodes 110, and so forth. Specific examples of these processes are described in, without limitation, "Dynamic Weighted Cost Multipathing," as cited above.

2.3. Network Device

Figure 2:
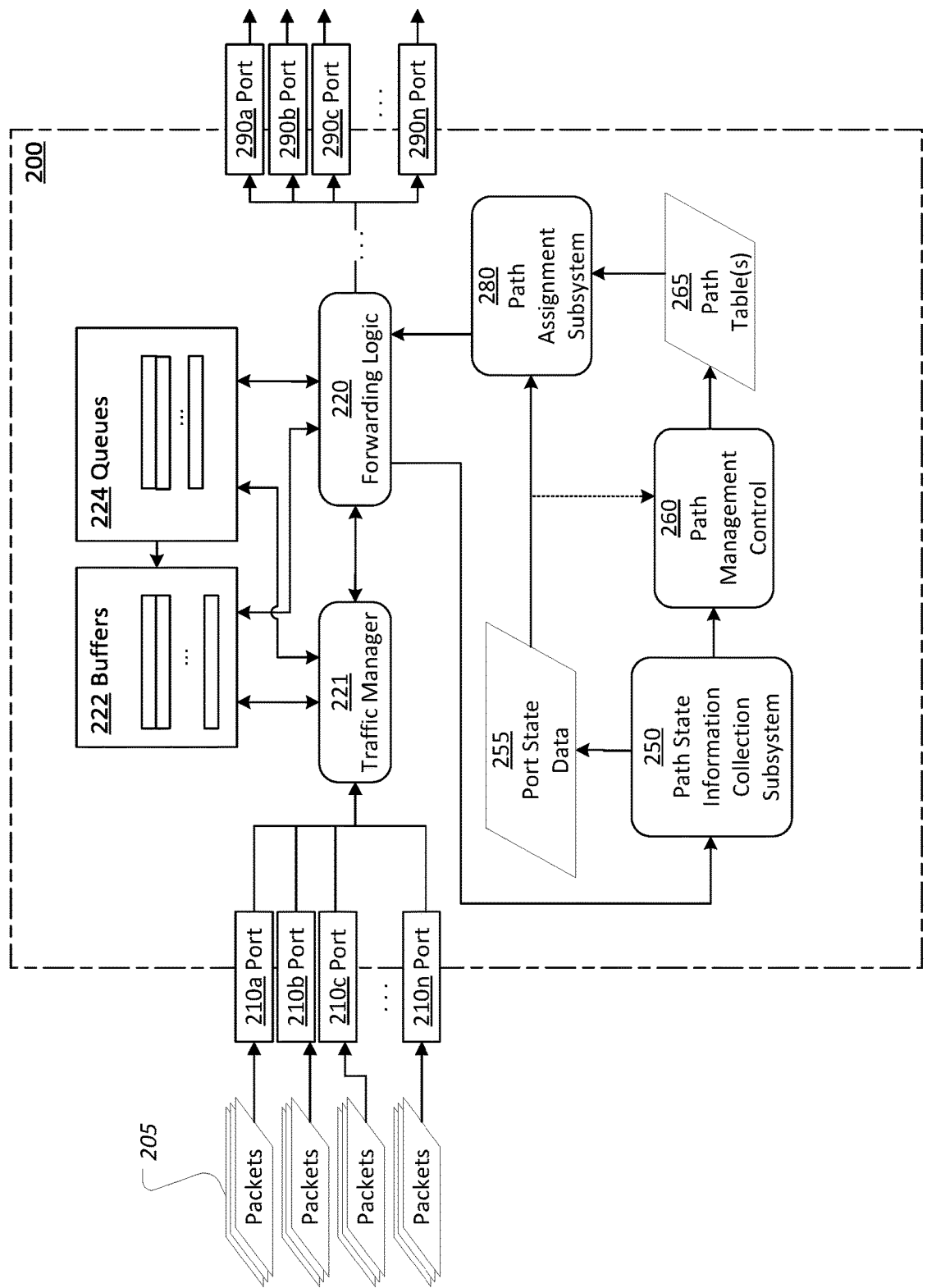
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. Note that, in an embodiment, some or all of the nodes 110 in system 100 may each be a separate network device 200.

2.4. Ports

Network device 200 includes ports 210/290. Ports 210, including ports 210a—n, are inbound ("ingress") ports by which data units referred to herein as packets 205 are received over a network, such as network 110. Ports 290, including ports 290a—n, are outbound ("egress") ports by which at least some of the packets 205 are sent out to other destinations within the network, after having been processed by the network device 200.

Ports 210/290 are depicted as separate ports for illustrative purposes, but may actually correspond to the same physical hardware ports on the network device 210. That is, a network device 200 may both receive packets 205 and send packets 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single ingress port 210 or egress port 290 into multiple ingress ports 210 or egress ports 290, or aggregate multiple ingress ports 210 or multiple egress ports 290 into a single ingress port 210 or egress port 290. Hence, in various embodiments, ports 210 and 290 should be understood as distinct logical constructs that are mapped to physical ports rather than simply as distinct physical constructs.

2.5. Traffic Management

Since not all packets 205 received by the device 200 can be processed by the packet processor(s) 250 at the same time, a traffic manager 221 of device 200 may store packets 205 in temporary memory structures referred to as buffers 222 while the packets 205 are waiting to be processed. For example, the device's forwarding logic 220 may only be capable of processing a certain number of packets 205, or portions of packets 205, in a given clock cycle, meaning that other packets 205, or portions of packets 205, must either be ignored (i.e. dropped) or stored. At any given time, a large number of packets 205 may be stored in the buffers 222 of the device 200, depending on network traffic conditions.

A buffer 222 may be a portion of any type of memory, including volatile memory and/or non-volatile memory. Device 200 includes a buffer manager configured to manage use of buffers 222 by device 200. Among other processing tasks, the buffer manager may, for example, allocate and deallocate specific segments of memory for buffers 222, create and delete buffers 222 within that memory, identify available buffer(s) 222 in which to store a newly received packet 205, maintain a mapping of buffers 222 to packets 205 stored in those buffers 222 (e.g. by a packet sequence number assigned to each packet 205 as the packet 205 is received), mark a buffer 222 as available when a packet 205 stored in that buffer 222 is dropped or sent from the device 200, determine when to drop a packet 205 instead of storing the packet 205 in a buffer 222, and so forth.

A packet 205, and the buffer(s) 222 in which it is stored, is said to belong to a construct referred to as a queue 224. A queue 224 may be a distinct, continuous portion of the memory in which buffers 222 are stored. Or, a queue 224 may instead be a set of linked memory locations (e.g. linked buffers 222). In some embodiments, the number of buffers 222 assigned to a given queue 224 at a given time may be limited, either globally or on a per-queue basis, and this limit may change over time.

The forwarding logic 220 of device 200 may process a packet 205 over one or more stages. A node may have many queues 224, and each stage of processing may utilize one or more of the queues 224 to regulate which packet 205 is processed at which time. To this end, a queue 224 arranges its constituent packets 205 in a sequence, such that each packet 205 corresponds to a different node in an ordered series of nodes. The sequence in which the queue 224 arranges its constituent packets 205 generally corresponds to the sequence in which the packets 205 in the queue 224 will be processed.

The traffic manager 221 is a component that manages the use of buffers 222 to store packets 205 (or copies thereof), assigns buffers 222 to queues 224, and manages the flow of packets 205 through the queues 224. The traffic manager 221 may, for instance, determine when to "dequeue" packets 205 from queues 224 and provide those packets 205 to specific packet processor(s) of forwarding logic 220. The traffic manager 221 may further identify a specific queue 224 to assign a packet 205 to.

2.6. Forwarding Logic

A device 200 comprises one or more packet processing components that collectively implement forwarding logic 220 by which the device 200 is configured to determine how to handle each packet the device 200 receives. Forwarding logic 220, or portions thereof, may, in some instances, be hard-coded. For instance, specific hardware or software within the node may be configured to always react to certain types of data units in certain circumstances in a certain way. Forwarding logic 220, or portions thereof, may also be configurable, in that the logic 220 changes over time in response to data collected from or instructions received from other nodes in the network in which the device 200 is located.

For example, a device 200 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For example, such attributes or characteristics may include a Quality-of-Service level specified by the data unit or associated with another characteristic of the data unit, a flow control group, an ingress port 210 through which the data unit was received, a tag or label in the packet's header, a source address, destination address, packet type, or any other suitable distinguishing property.

In an embodiment, forwarding logic 220 may read port state data 255. Port state data 255 may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic 220 may be configured to implement the associated rules or policies associated with the flow(s) to which a given packet belongs.

Forwarding logic 220 may process a data unit over multiple stages. At each stage, the data unit is placed in a buffer 222, which is said to belong to a queue 224. A device 200 may have many queues 224, and each stage of processing may utilize one or more of the queues 224. At any given processing stage, one or more packet processing components, such as a Field Programmable Gate Array (FPGA), Application-Specific Integrated Circuit (ASIC), or a general purpose processor executing software-based instructions, reads data units from associated queues 224 and determines how to handle the data units.

In an embodiment, different queues 224 may exist for different destinations. For example, each port 210 and/or port 290 may have its own set of queues 224. The queue 224 to which an incoming packet 205 is assigned may therefore be selected based on the port 210 through which it was received, while the queue 224 to which an outgoing packet is assigned may be selected based on forwarding information indicating which port 290 the packet should depart from. A different packet processor may be associated with each different set of one or more queues 224. Hence, the current processing context of the packet 205 may be used to select which queue 224 a packet 205 should be assigned to.

In an embodiment, there may also or instead be different queues 224 for different flows or sets of flows. That is, each identifiable traffic flow or group of traffic flows is assigned its own set of queues 224 to which its packets 205 are respectively assigned. In an embodiment, different queues 224 may correspond to different classes of traffic or quality-of-service (QoS) levels. Different queues 224 may also or instead exist for any other suitable distinguishing property of the packets 205, such as source address, destination address, packet type, and so forth.

For instance, a data unit may be forwarded to another queue 224 associated with another processing stage implemented by another set of processing components, sent out of the device 200 over an outbound port 290, discarded, delayed for flow control reasons, and so forth. The collective actions of these processing components over these multiple stages is said to implement the forwarding logic of the device 200.

Though only one pair of traffic manager 221 and forwarding logic 220 are depicted, in an embodiment, the traffic manager 221 and forwarding logic 220 are duplicated for some or all of the stages. For example, there may be a traffic manager 221 and forwarding logic 220 for an ingress stage performed upon receipt of a packet 205, a traffic manager 221 and forwarding logic 220 for an egress stage performed upon the packet 205 exiting the system 200, and/or a traffic manager 221 and forwarding logic 220 for any number of intermediate stages. The packet 205 may thus pass through any number of traffic managers 221 and/or forwarding logic 220 prior to exiting the system 200.

An example flow of a packet 205 through device 200 is as follows. The packet 205 may be received by a port 210. The packet 205 is then processed by an initial packet processor (in some embodiments known as a packet pre-processor), and then delivered to a traffic manager 221. Traffic manager 221 stores the packet 205 in a buffer 222 and assigns the packet 205 to a queue 224. Traffic manager 221 manages the flow of the packet 205 through the queue 224 until the packet 205 is released to another packet processor. Depending on the processing, the traffic manager 221 may then assign the packet 205 to another queue so that it may be processed by yet another processor, or the packet processor may send the packet 205 out another port 290.

In the course of processing a packet 205, a device 200 may replicate a packet 205 one or more times. For example, a packet 205 may be replicated for purposes such as multicasting, mirroring, debugging, and so forth. Thus, a single packet 205 may be replicated to multiple queues 224. Hence, though certain techniques described herein may refer to the original packet 205 that was received by the device 200, it will be understood that those techniques will equally apply to copies of the packet 205 that have been generated for various purposes.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

2.7. Performance Monitoring Subsystems

According to an embodiment, a device 200 may comprise any of a variety of subsystems configured to facilitate various aspects of monitoring the performance of a network, such as an annotation subsystem, a reflection subsystem, and a visibility subsystem.

An annotation subsystem interfaces with forwarding logic 220 and/or traffic manager 221 to identify when to annotate packets with state information (e.g. using annotation criteria) and insert the state information into the identified packets. The annotated state information may include, for example, node state information already stored at the device 200 due to the operation of other component(s) (not depicted) and/or node state information generated by components within device. Node state information may also, in some embodiments, impact when the device 200 chooses to annotate a packet (e.g. triggered by a congestion level or amount of delay). Suitable selective annotation techniques for an annotation subsystem are described in, without limitation, "Dynamic Weight Cost Multipathing."

Reflection subsystem interfaces with forwarding logic 220 and/or traffic manager 221 to identify when to reflect packets back along the path from whence the packets came (e.g. using reflection criteria), and interfaces with forwarding logic 220 to take appropriate actions to actually reflect packets identified for reflection. Node state information may, in some embodiments, impact when the device 200 chooses to reflect a packet (e.g. triggered by a congestion level or amount of delay). Suitable selective reflection techniques for a reflection subsystem are described in, without limitation, "Dynamic Weight Cost Multipathing."

In an embodiment, the forwarding logic may be configured such that certain packets that would have been dropped by the forwarding logic or traffic manager, and/or certain related packets, are instead processed by a visibility subsystem that transforms the packets into special visibility packets. Conceptually, the packets to be transformed may be viewed as being forwarded to a visibility path instead of the normal path to which they otherwise would have been forwarded. The visibility component analyzes the visibility packets and optionally generates logs or reports based thereon. In this manner, the device 200 provides insight into drops or other events. The visibility subsystem may further react to certain visibility packets, or trends based thereon, by changing the configuration of device 200 or by sending packets to other nodes in a network.

A device 200 may further comprise a path state information subsystem 250. Path state information subsystem 250 interfaces with forwarding logic 220 to identify when to collect information from packets that have been marked as reflected (i.e. by other nodes of the network in which device 200 resides), when to generate and store metrics based on annotated information within received packets, when to generate metrics internally, and optionally when to take one or more actions based thereon.

Path State Information

State information may take a variety of forms and be generated in a variety of manners depending on the embodiment. Path state information is collected over time for at least the primary paths to a destination. Examples of path state information may include, without limitation, measures of Port Utilization, Queue Length (in packets or bytes), Port Length (in packets or bytes), Queue Delay (in seconds), Port Delay (in seconds), Measured Path Imbalance (as a ratio), and so forth.

Any suitable mechanisms for collecting path state information may be utilized. Examples of such mechanisms include, without limitation, the probing, reflection, and visibility packet mechanisms described above. Another example of a mechanism capable of providing at least some path state information is the tracking of congestion levels of internal queues of buffered packets associated with each path within the node itself. Examples of such a mechanism are described in, without limitation, U.S. application Ser. Nos. 14/958,830 (filed Dec. 3, 2015) and 14/973,541 (filed Dec. 17, 2015), the entire contents of both of which are hereby incorporated by reference as if set forth in their entirety herein.

In an embodiment, the path state information includes at least one metric that is used to quantify the quality of the path (e.g. Path Congestion or Path Quality State). This metric is referred to herein as a quality level, and may range from a simple binary enumeration such as "congested" or "not congested," to a range of numbers of any size and granularity. The quality level may be a function of one or more collected measures. In an embodiment, multiple individual path state measures may be combined to represent a single group state.

The path state information may, in some embodiments, include a historical component. For example, a log of some or all of previously collected state information may be maintained. As another example, a moving average of certain metrics may be calculated, without necessarily preserving all path state information.

In an embodiment, network metrics generated by any of a variety of frameworks at a device may be used as state information. An example of such a framework is the In-band Network Telemetry ("INT") framework described in C. Kim, P. Bhide, E. Doe, H. Holbrook, A. Ghanwani, D. Daly, M. Hira, and B. Davie, "Inband Network Telemetry (INT)," pp. 1-28, September 2015, the entire contents of which are incorporated by reference as if set forth in their entirety herein. Examples of state information may further include, without limitation, information generated by the traffic manager 221, such as queue size, drop counters, queue delay, etc., and/or port state information, such as RX/TX bytes, RX/TX utilization, flow control state, etc.

In an embodiment, some or all nodes in a network may report, through annotation and/or other techniques, per-port loading state (for one or more ports), resulting in per-port loading states for multiple nodes in a path being reported in a single packet. This may enable, for example, communication of device state to one or more endpoints in a rapid manner, allowing a more responsive control algorithm. Alternatively, or additionally, a one-way total delay metric may be calculated at some or all of the annotating nodes. This metric may measure the total delay along the path up to the annotating node.

In an embodiment, the P4-INT metric "Egress Port TX Link Utilization," for instance, is an example of a suitable metric that may be utilized in certain embodiments to convey path state on a per-hop basis. An example of a congestion metric that may be accumulated along a path is described, without limitation, in M. Alizadeh, T. Edsall, S. Dharmapurikar, R. Vaidyanathan, K. Chu, A. Fingerhut, V. T. Lam, F. Matus, R. Pan, N. Yadav, T. Edsall, S. Dharmapurikar, R. Vaidyanathan, K. Chu, A. Fingerhut, V. T. Lam, F. Matus, R. Pan, N. Yadav, and G. Varghese, CONGA: distributed congestion-aware load balancing for datacenters, vol. 44, no. 4. ACM, 2015, pp. 503-514, the entire contents of which are incorporated by reference as if set forth in their entirety herein.

Epochs

In an embodiment, to conserve resources and/or for other reasons, certain metrics, such as the quality levels, are only calculated periodically or at other intervals, whereas other path state information is collected on a continual basis. For instance, a system may divide time up into periods referred to as measurement epochs, or simply "epochs." Epochs may be, for example, predefined and regularly occurring intervals of time (e.g. a predefined number of milliseconds or clock cycles), or potentially varying periods of time delimited by occurrences of certain triggering conditions. Quality levels may only be calculated once each epoch, and only updated at the end or beginning of an epoch. In an embodiment, new path state information may be collected throughout a measurement epoch, but only presented to the path selection process at the end or beginning of the epoch. Thus, the path state(s) as used for the triggering conditions and/or set membership decisions described herein would remain static for the duration of the epoch.

2.8. Path Selection and Management

A variety of path selection techniques exist for forwarding logic 220 to select a path for a packet. One of the most common of these techniques assigns weights to each path. The weights are intended to quantify some aspect of the path such as the total number of hops in the path and/or the speed or length of the path. Generally, the technique involves selecting a "shortest path" based on routing metrics, representing costs that are generally computed at least in part on these weights. The selected path typically (but not necessarily) corresponds to the path with the lowest cost. Though there are many varieties of algorithms for identifying path cost, one example type of algorithm is known as a "shortest path" algorithm. This algorithm, may, for example, be employed to identify and calculate the costs for all paths within a network topology, based on individual weights assigned to the nodes and links (also known as "edges") within that topology.

Complex network topologies, such as those found in data centers having thousands or even millions of nodes, employ multiple paths among servers to deliver scalable, cost-effective network capacity. To more efficiently route traffic through a network, the forwarding logic 220 at some or all of the nodes in the network may include a load-balancing component configured to distribute traffic to the same destination across multiple paths. The simplest and the most widely deployed approach for load balancing among these paths, Equal Cost Multipath (ECMP), divides flows among the shortest paths toward a destination. ECMP is designed to utilize an ideally uniform hashing of balanced flow sizes to achieve fairness and good load balancing between paths.

Alternatively, a Weighted Cost Multipath (WCMP) approach is often used to balance traffic in such network topologies. WCMP is described in detail in J. Zhou, M. Tewari, M. Zhu, A. Kabbani, L. Poutievski, A. Singh, and A. Vandat, WCMP: weighted cost multipathing for improved fairness in data centers. New York, N.Y., USA: ACM, 2014, pp. 5-14, the entire contents of which is incorporated by reference for all purposes as if set forth herein. Generally, WCMP assigns weights to paths and distributes traffic to the paths roughly in proportion to their assigned weights. Note that these weights correspond to the relative frequency of assignment of packets to a path, and are therefore not to be confused with the weights that are used to calculate the cost of a path. The weights themselves may be determined in a variety of manners. For instance, Zhou et al. assigns each port a weight roughly proportional to the capacity of each port.

In an embodiment, dynamic weights in conjunction with the WCMP approach. A path management control subsystem 265 in device 200 is configured to analyze path state information, such as may be collected by subsystem 250 or forwarded from another node, and determine when network conditions warrant adjusting path weights. Alternatively, an external path management control subsystem 265 may send instructions to device 200 to adjust path weights. More details about these and other path selection techniques are described in "Dynamic Weighted Cost Multipathing," as referenced above.

In an embodiment, some or all of the foregoing techniques may be implemented using one or more path tables 265 that map destination addresses, subnets, or other components to paths through a network. Path management controller 260 may determine when to add or remove paths from various path tables 265 based on information collected by state information collection subsystem 250. In an embodiment with dynamic weights, a path management controller 260 adjusts weights by changing the number of entries assigned to a given path in a path table 265. In other embodiments, path management controller 260 may be configured to adjust paths in a path table 265 to route traffic around congested links or nodes in a network, or towards favored links or nodes. In yet other embodiment, other suitable data structures may instead be utilized for path selection.

Path Assignment Subsystem

In an embodiment, a device 200 may comprise a path assignment subsystem 280 configured to select paths to assign to packets using techniques described herein. Path assignment subsystem 280 may be separate from or part of forwarding logic 220.

In an embodiment, path assignment subsystem 280 may be configured to implement multiple path selection approaches, each mapping a packet to potentially different paths. For instance, the path assignment subsystem 280 may include primary path selection logic that uses ECMP, WCMP, or other suitable algorithms to select a primary path for a packet from a primary path table. The path assignment subsystem 280 may further comprise one or more additional path selection logics configured to select secondary or other alternative paths using different tables and/or selection algorithms.

Each path selected through each of the approaches implemented by path assignment subsystem 280 is, in effect, a candidate path that may be assigned to the packet. In an embodiment, the path assignment subsystem 280 may be configured to determine which candidate path to select based on state information, such as a measure of delay or congestion, that indicates a current quality state of one or more of the candidate paths. For instance, the primary path may be preferred any time the primary path is not in a low-quality state (e.g. any time the collected state information does not indicate that the primary path is congested or experiencing high latency). On other occasions, to reduce the load on the primary path, the path assignment subsystem 280 may optionally select a different one of the candidate paths to assign, thus "redistributing" the packet from what would have been its normally selected ("primary") path to another available path, thereby achieving better load-balancing between paths in a network.

In an embodiment, the path assignment subsystem 280 may be configured to only redistribute packets that are deemed "move-eligible," or redistributable. That is, for various reasons, it may still be desirable to forward a certain percentage of packets along their selected primary path, even if their primary path is in a low-quality state. Hence, path assignment subsystem 280 may comprise move-eligibility logic to determine whether a given packet can be assigned to a path other than the selected primary path. In an embodiment, a packet that is designated as redistributable may always be assigned to a path other than the primary path. In an embodiment, a packet that is designated a redistributable may nonetheless only be assigned to a path other than the primary path under certain circumstances (e.g. the primary path being in a low-quality state). In an embodiment, the move-eligibility logic may change over time, such that a packet that would be redistributable at one time under certain network conditions is not redistributable at other times under other network conditions.

Other example details of path assignment subsystems are described in other sections herein.

Packet Re-Ordering

In some embodiments, certain techniques described herein may result in packet re-ordering issues, whereby packets belonging to the same flow are sent along different paths. For instance, suppose a flow A comprises 10 packets. Packets 1-8 from a flow A are routed to a primary path P1. However, before packets 9 and 10 are routed, P1 may be determined to be congested, and/or packets belonging to flow A may be designated as redistributable. Hence, packets 9 and 10 are routed through an alternative path P2. If P2 is significantly faster than P1, packets 9 and 10 may arrive at their destination node before some or all of packets 1-8, which may cause problems at the destination node. Such packet reordering can lead to poor performance for a number of transport protocols (e.g. TCP). While, in many embodiments, some packet re-ordering may be acceptable, various techniques described in other sections may be utilized to reduce packet re-ordering.

2.9. Miscellaneous

In an embodiments comprising multiple instances of the traffic manager 221 and forwarding logic 220 for multiple stages, the path assignment and traffic distribution techniques described herein may be performed only once, such as during an ingress stage (as opposed to the egress stage). For example, components 250-280 may optionally be coupled only to the forwarding logic 220 of the ingress stage.

Device 200 illustrates only one of many possible arrangements of components configured to provide the functionality described herein. Other arrangements may include fewer, additional, or different components, and the division of work between the components may vary depending on the arrangement.

3.0. Path Assignment

Figure 3:
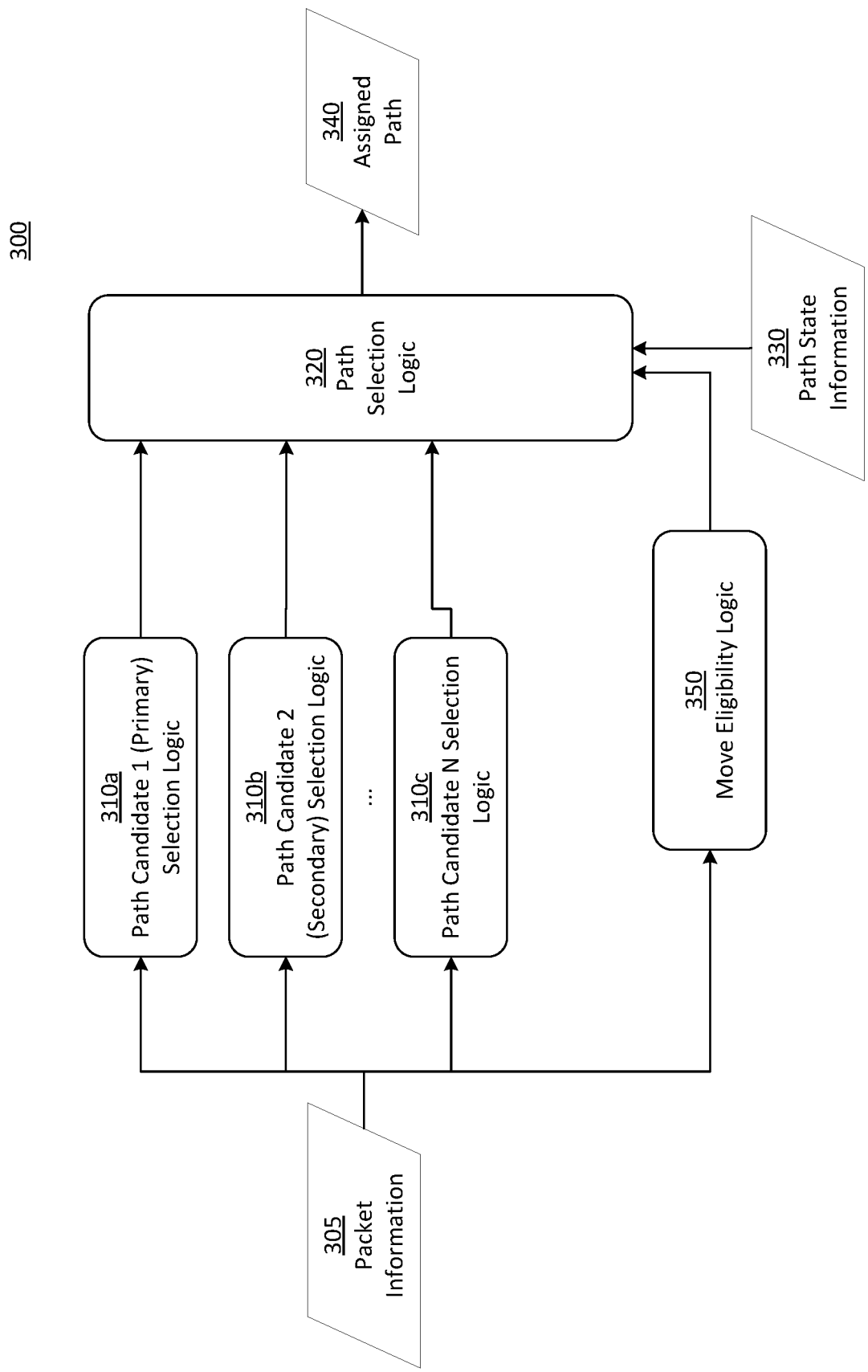
FIG. 3 illustrates an example path assignment subsystem.

FIG. 3 illustrates an example path assignment subsystem 300, according to an embodiment. Path assignment subsystem 300 may be implemented by, for example, a networking computing device, such as a router or switch. In an embodiment, some or all of the components of path assignment subsystem 300 described herein are implemented using application-specific integrated circuits (ASICs) or field programmable gate arrays (FPGAs). In an embodiment, a computing device may include one or more memories storing instructions for implementing various components of path assignment subsystem 300 described herein, one or more hardware processors configured to execute the instructions stored in the one or more memories, and various data repositories in the one or more memories for storing data structures utilized and manipulated by the various components. Path assignment subsystem 300 may, in some embodiments, be an example of a path assignment subsystem 280 in FIG. 2.

Path assignment subsystem 300 is configured to select a path 340 to assign to a packet based on inputted packet information 305. The packet information 305 may be any information found in or associated with the packet. For instance, the packet information 305 may be a flow identifier, a combination of one or more fields of the packet (e.g. a "five-tuple" combination of a source address, source port, destination address, destination port, and protocol), or any other suitable information. In an embodiment, packet information 305 forms a key upon which path assignment subsystem 300 executes multiple hash functions.

Path assignments subsystem 300 comprises two or more path candidate selection logic elements 310, each configured to implement a different selection approach to select potentially different paths based on packet information 305. The path candidate selection logics include a primary path candidate selection logic 310a and any number of alternative path candidate selection logics 310b-310n. The primary path candidate selection logic 310a selects a primary path for the packet whose information 305 is provided, from a group of potential primary paths. For instance, primary path candidate selection logic 310a may select a path from an ECMP or WCMP group. Other path candidate selection logics 310 select, potentially, different paths based on the packet information 305. In an embodiment, each path candidate selection logic 310 utilizes a hash function to select a path. In an embodiment, each path candidate selection logic 310 may utilize a different function or technique to select a path, and/or select a path from a different group of paths.

Each path selected by candidate selection logics 310 is considered a candidate path that may, under certain circumstances, be selected by path selection logic 320 as the path 340 to assign for the packet whose information 305 was inputted. In an embodiment, some or all of path candidate selection logics 310 may output their respective selections in parallel to path selection logic 320. In an embodiment, some or all of path candidate selection logics 310 may output candidate paths serially, if path selection logic 320 determines that their respective selections are needed. For instance, in an embodiment, the primary path candidate selection logic 301a is always executed, and other candidate selection logics 310 are only selected upon request by path selection logic 320 (e.g. if the primary candidate path is in a low-quality state). Additional specific examples of these and other arrangements of the candidate selection logics 310 are described in other sections.

In an embodiment, path selection logic 320 determines which candidate path to assign as path 340 based at least partially upon path state information 330. The path state information 330 generally indicates some measure of quality for at least some of the candidate paths. This measure of quality may be any suitable measure, or function thereof, such as a measure of latency or congestion, as described in other sections. The measure may be, without limitation, a percentage, amount of time, number, enumerated state.

In an embodiment, the path selection logic 320 may be configured to assign the packet to the primary path (i.e. the primary candidate path) selected by primary path candidate selection logic 310a unless the primary path is in a low-quality state. If the quality measure is not itself an enumerated state, the path selection logic 320 may compare the quality measure to some threshold to determine its state. The threshold may be global, specific to some destination or group, or relative to other candidate paths. The threshold may also be fixed, or change over time.

In an embodiment, if the primary path is in a low-quality state, then another candidate path is selected. In an embodiment, rather than selecting another candidate path without further qualification, path selection logic 320 may be configured to select any candidate path that is not also in the low-quality state, but otherwise select the primary path. Where multiple candidate paths are still available for assignment, the candidate paths may have a fixed preference order (e.g. the path selected by logic 310b, then by 310c, then by 310d, etc.). The candidate paths may also or instead be ranked by their quality measures, such that the highest quality path is selected.

In an embodiment, rather than favoring the primary path, the candidate path with the highest quality measure is always selected. In an embodiment, path selection logic 320 may rank candidate paths by any suitable factor (e.g. the quality measure, a fixed preference order, etc.), and select the highest ranked candidate path. Ranking functions may take any suitable level of complexity, and may weight different factors in different manners depending on which path candidate selection logic 310 selected a candidate path.

In an embodiment, move-eligibility logic 350 signals to path selection logic 320 whether path selection logic 320 may (or, in some embodiments, must) assign a path other than the primary path selected by primary path candidate selection logic 310a. That is, even if the path state information 330 indicates that another candidate path is performing better, a primary path may still be selected if the move-eligibility criteria considered by move-eligibility logic 350 are not satisfied. In an embodiment, the move-eligibility criteria include the flow of a packet, the destination or source address of a packet, a quality-of-service level or class of the packet, a type of the packet, whether or not the packet information 305 includes a specific flag that marks the packet as eligible for redistribution, or any other suitable criteria. In an embodiment, move-eligibility logic 350 determines whether a packet is eligible for redistribution based on executing a hash function on some or all of the inputted packet information 305, and comparing the outputted hash value to a designated set of move-eligible values, as described in other sections.

In an embodiment, to better conserve resources, move-eligibility logic 350 may signal to one or more of the path candidate selection logics 310 that they should (or should not) provide output to path selection logic 320 when move-eligibility logic 320 determines that the packet should (or should not) be redistributed away from the primary path.

Device 200 illustrates only one of many possible arrangements of components configured to assign a path to a packet. Other arrangements may include fewer, additional, or different components, and the division of work between the components may vary depending on the arrangement. For example, in an embodiment, one of move-eligibility logic 350 or path state information 330 may be optional. That is, past selection logic 320 may determine which path to select based only on a move-eligibility determination by move-eligibility logic 350, or based only on path state information 330.

In an embodiment, not all of candidate selection logics 310 and move-eligibility logic 350 need consider the exact same set of packet information 305. For instance, move-eligibility logic 350 may ignore, or even be configured not to receive, a certain packet field that primary path candidate selection logic 310a relies upon. Similarly, path candidate selection logic 310c may ignore or not receive a field that path candidate selection logic 310b relies upon.

Example aspects of specific path candidate selection mechanisms, such as path candidate selection logics 310, and arrangements thereof, are now described.

3.1. Path Selection Groups

Each path candidate selection mechanism is configured to select a candidate path from a specific path selection group, which may be the same for each path candidate selection mechanism, or different for some or all of the path candidate selection mechanisms. The makeup of each path selection groups may vary from embodiment to embodiment. Each group comprises one or more paths to an associated destination.

Generally, a path selection group may be characterized as being either a primary group or an alternate group.

Primary Group

In an embodiment, a highest priority group, used for the highest priority path candidate selection mechanism(s) (e.g. the primary path candidate selection logic) is known as a primary group of paths. The primary group may be, for example, an Equal Cost Multipath (ECMP) or Weighted Cost Multipath (WCMP) group. In an embodiment, the primary group is a group of paths that are determined to be shortest (e.g. a group of shortest paths) between the node selecting the path and the destination. In other embodiments, the primary group may be any group of paths chosen for any suitable reason.

Alternate Group

In some embodiments, an alternate group of paths is used in addition to the primary group. The alternate group may also be any group of paths to an associated destination, chosen for any suitable reason. In some embodiments, some or all of the paths in the alternate group will not be found in the primary group. For instance, whereas the paths in the primary group may be considered "optimal," "primary," or "shortest" paths, the paths in the alternate group may consist partially or entirely of "non-optimal," "non-primary," or "non-shortest" paths.

For instance, there are many possible paths between Node D and Node G in FIG. 1. Conventional routing algorithms might only send traffic along paths corresponding to the two direct links between Node D and Node G, forming a group of "shortest" paths. By contrast, a set of non-shortest paths, such as paths consisting of Nodes G-F-C-D or Nodes G-H-E-D, may nonetheless serve as a useful alternate group of paths if the two direct links between G and D become overloaded. The strategic assignment of certain packets to paths from this alternate group may help alleviate problems arriving from limited capacity along the paths in the primary group.

The alternate group of paths may include all non-primary paths to the destination, or a subset of the non-primary paths. Where the alternate group includes a subset of the non-primary paths, the subset may be selected using, without limitation, approaches based on topological distance or weight, random selection, and/or, if path state information is also available for non-primary paths, metric(s) related to path state.

Multiple Levels of Alternate Groups

According to an embodiment, there may any number of different alternate groups, each being utilized under different conditions. For instance, each alternate group may have a different priority, and when the alternate path selected from one alternate group does not meet certain conditions for assignment, an alternate path may be selected from another group. Or, alternate paths may be selected from multiple alternate groups, and various assignment criteria may be utilized to determine which of these alternate paths to assign.

3.2. Selecting a Candidate Path from a Group

Although some embodiments are not limited to any specific selection logic, in at least some embodiments, a path candidate selection mechanism will select a path from its associated group for a given packet based on some function of information within the packet. That is, a primary path may be selected from a primary group of paths using a function of information within the packet, just as an alternate path may be selected from an alternate group of paths using a function of information within the packet.

For example, each path in a group may be assigned one or more indexes within an array or table for that group (referred to subsequently as the group path table—or, when in reference to a specific group or set of paths, a primary path table, secondary path table, or alternate path table). A portion of the packet, such as a certain set of header fields (either summed or concatenated), or a certain number of bits at the start of the packet, may be provided as input (an "input key") into the function. The function itself may take any form, though a hash function is one example of a suitable type of function. One specific example of a suitable type of function is a hash function that uses a modulo operation to calculate a remainder when the input key is divided by the number of possible output values. Another specific example of a suitable type of function is a checksum function, such as a cyclic redundancy check (CRC) function. Based on the input from the packet, the chosen function outputs a value. The path whose index corresponds to that value is selected as the primary path for the given packet.

Note that the specific function used need not be the same for each group. For instance, different hash functions may be implemented for different groups. On the other hand, in some embodiments, the same function may be used for at least some of the groups.

Figure 4:
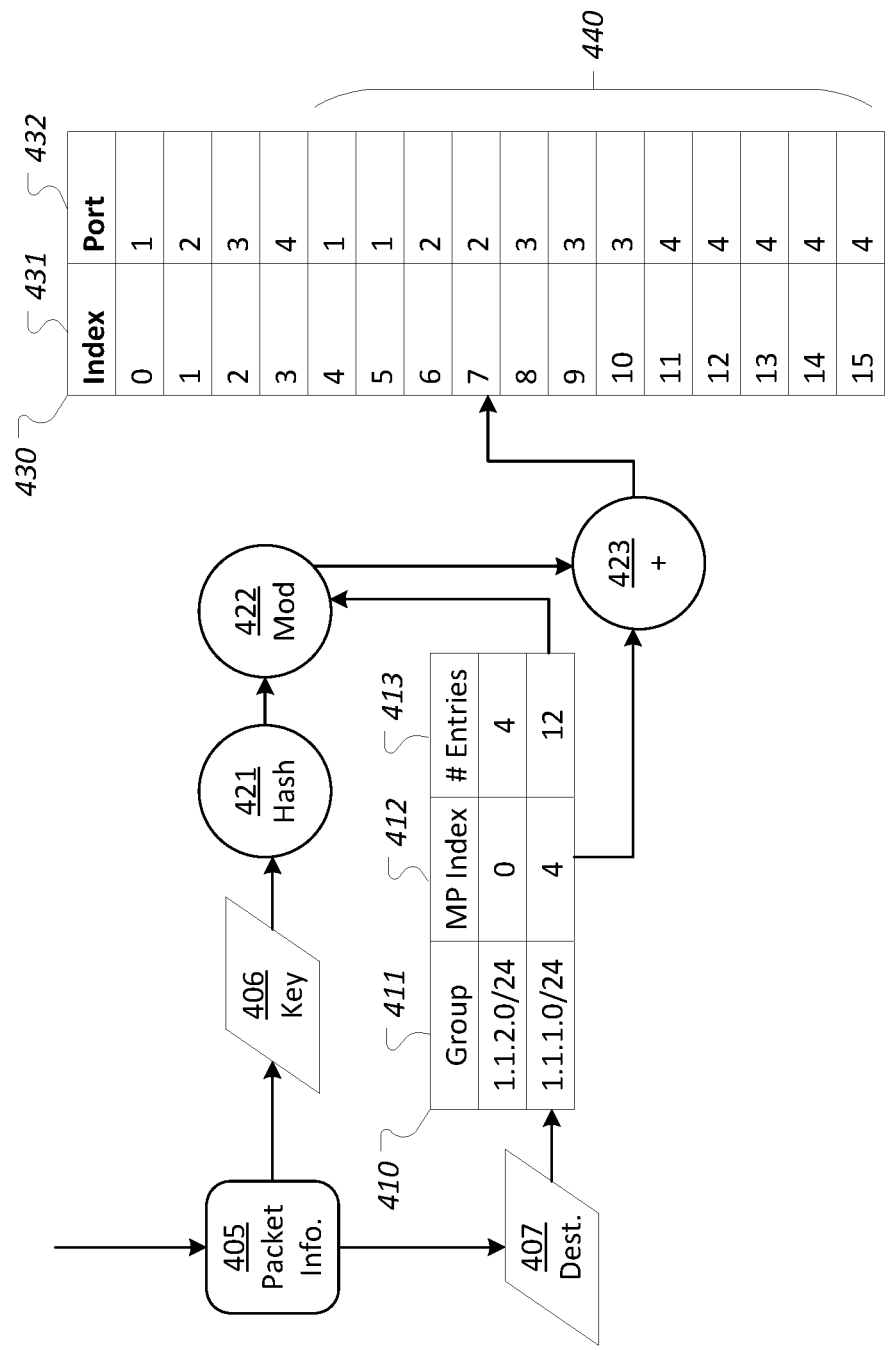
FIG. 4 is a block diagram of an example system suitable for selecting candidate paths from a group of paths.

FIG. 4 is a block diagram of an example system 400 suitable for selecting candidate paths from a group of paths, according to an embodiment. System 400 may, in some embodiments, be compatible with system 200, in that path table 430 may be an example of a path table 265, while logic elements 421-423 may be components of forwarding logic 220. In other embodiments, system 400 may be implemented in systems other than system 200.

Multipath table 430 includes entries for two groups, including WCMP group 440. Each group includes a number of entries (rows), each having a different index 431. The index 431 need not necessarily be stored, but rather each index 431 may simply correspond to a different address in memory storing an associated value 432. The associated value 432 represents a path. In an embodiment, each path is represented by a port out which a packet must be forwarded to be sent along the represented path. Optionally, additional data may be stored in the entries of table 430 as well.

Each group is associated with a different group identifier 411 identified in table 410. Group identifier 411 is depicted as a prefix for illustrative purposes, but may be any suitable identifier. Table 410 defines a starting index 412 and number of entries 413 for each group. Hence, in accordance with the depicted example, the first four entries in table 430 store an ECMP group for traffic destined to prefix 1.1.2.0/24. The next 12 entries in the table store a WCMP group 440 for weighted distribution of traffic destined to prefix 1.1.1.0/24.

Execution of the logic of system 400 begins with resolving the packet information 405 to a multipath group identifier in table 410. For instance, the destination address 407 of the packet may be matched against the Longest Prefix Match (LPM) entries. The entry selected is the highest priority entry whose prefix 411 matches the destination address 407. The selection of the entry can be said to select the multipath group to which the packet belongs. Although the example embodiment illustrates table 410 as identifying groups by prefix, it will be recognized that table 410 may simply identify each group by some identifier, and that the process of resolving a packet to a group identifier may be implemented by prefix matching or other suitable process without the involvement of table 410.

The packet header is used to derive a key 406 (e.g. a "five-tuple" key derived from various packet fields). The key 406 is entered into hash function 421 to compute a hash value.

System 400 then consults the table 410 to determine the number of multipath entries 413 in the selected multipath group, as indicated by the selected entry in table 410. System 400 then performs a modulo operation 422 between the hash value and the number of multipath entries 413 in the selected multipath group.

System 400 then consults the table 410 to determine the starting index 412 for multipath entries in path table 430 for the selected multipath group, again as indicated by the selected entry in table 410. System 400 then performs an addition operation 423 between the output of the mod operation 422 and the identified starting index 412.

System 400 then looks up the entry in multipath table 430 whose index matches the output of addition operation 423. The egress port 432 of this entry is read from the multipath table 430. This port may then be used to send the packet.

FIG. 4 illustrates but one example of mechanism for selecting a candidate path from a group of paths. Other embodiments may include fewer or additional elements in varying arrangements. Other types of data structures may be utilized instead of or in addition to those depicted, and of course the contents of those data structures may vary depending on the architecture of the system in which they are utilized.

3.3. Secondary Paths

In some embodiments, more than one path may be selected from a group. For instance, in addition to primary path candidate selection logic selecting a primary path from a primary group, one or more other path candidate selection logics may also select candidate paths from the primary group. Such candidate paths are referred to herein as secondary paths. A secondary path may be of lesser priority than the primary path selected from the same group of paths, in that traffic is only reassigned to a secondary path when certain conditions are met. In embodiments where there are path candidate selection mechanism(s) that select from alternate group(s), a secondary path may or may not take priority over an candidate path selected from an alternate group, depending on the embodiment. Moreover, in some embodiments, there may be one or more secondary alternate paths from an alternate group, which may be utilized when the first candidate path selected from the alternate group fails to meet certain criteria.

The secondary path is selected in a slightly different manner than the primary path or alternate path. The manner may differ in a number of aspects. For instance, the secondary path may be selected using a different function of the information within the packet (e.g. a hash function that is orthogonal to the hash function used to select the primary path).

As another example, in an embodiment, the secondary path selection technique may be constrained to select from only a subset of the relevant group, referred to herein as the secondary set, or subset. For example, the secondary set may be a user-specified subset of the primary paths, or a randomly selected subset of the primary paths.

In an embodiment, the secondary set is calculated based on a ranking of paths in the group by some metric(s). For instance, the delay or congestion along a path may be quantified using some metric or combination of metrics (e.g. quality level, a moving average of the quality level, etc.) in the path state information. The secondary set may be a fixed size set of paths that are ranked highest (e.g. having the lowest historical congestion or delay). Or, the secondary set may be the set of all paths in the group for which the metric meets some specific threshold (e.g. all primary paths with a congestion level of 1).

In an embodiment, the secondary set is re-selected at periodic or other intervals (e.g., an epoch). For embodiments where the secondary set is calculated based on some metric (s), this means that the secondary set may change over time as the metrics change. This may, for example, have the consequence that traffic that would have been sent along a low-performing primary path selected through the primary selection logic is redirected to less congested or otherwise higher performing paths in the secondary set.

In some embodiments, each of the paths in the primary group and the secondary set may have been topological "shortest paths" according to conventional routing algorithms. However, using recent path state information to identify which of these "shortest paths" are currently performing better, and composing a secondary set of those better performing "shortest paths," enables better load balancing amongst these topological "shortest paths," whereas conventional routing algorithms may have been blind to the actual states of these shortest paths.

In an embodiment, multiple secondary paths may be selected either iteratively or in parallel using different selection approaches. Each secondary path may be assigned a priority, and the highest priority secondary path that meets relevant threshold conditions may be assigned.

3.4. Assigning Non-Primary Paths

A packet is usually assigned to a primary path—that is a candidate path selected from the primary group using the primary path selection logic. However, as discussed above, for load balancing and/or other reasons, it may not always be desirable to actually assign the packet to the selected primary path. Hence, different triggering conditions may exist for determining when to assign a packet to an alternative path, such as a secondary path or a candidate path selected from another path selection group.

In general, a path assignment subsystem, or path selection logic therein, may decide to assign traffic to an alternative path in one of two ways. First, each selected candidate path (e.g. primary, secondary, or other alternative) may have some relevant qualifying condition(s) under which it may be assigned. These condition(s) may be based on path state information and/or operating logic. The selected candidate paths may be prioritized in some predefined order (e.g. primary, secondary, and alternate), and considered in succession. If a selected path (and/or, in some cases, the group from which the path was selected) meets the relevant condition(s), the traffic is assigned to the path. Otherwise, the next path is considered. A default selection may be provided (e.g. the primary path or the final alternate path), which is assigned unconditionally if all other paths fail.

Alternatively, a number of candidate path selections may be compared to each other, and ranked or filtered according to some criteria (e.g. quality level). An assignment may be made based on this comparison. Of course, the two approaches may also be combined. For instance, if a certain selected path fails, selections from multiple other groups and/or multiple secondary paths may be compared to each other to identify a path to assign.

Examples of more specific factors upon which assignment of an alternative path may be conditioned are given, without limitation, elsewhere herein.

Move-Eligibility Criteria

Although not necessarily true of all embodiments, in certain embodiments it may be desirable to limit the amount of traffic that is redirected from a primary path to some defined subset of the traffic that could be redirected. In such an embodiment, in order for traffic to be moved from the primary group, that traffic must meet some move-eligibility criteria. The move-eligibility criteria may be a function of the packet itself, and/or other factors. Move-eligibility may, in some embodiments, be a pre-condition to assigning a packet to a path other than the selected primary path.

In an embodiment, move-eligibility criteria are selected such that only traffic from a target fraction of the data flows moving along a path are actually redirected. This may be true even in cases where reassignment of the traffic from a data flow would move the traffic from a lower quality path to a higher quality path, since immediate reassignment of all traffic from the lower quality path may have undesirable effects in certain embodiments. Moving only a fraction of the flows, on the other hand, still reduces congestion along the path while improving overall path quality with minimal disruption.

In a simple embodiment, a certain fraction of packets may be selected as move-eligible at random, or based on the time at which they are received. However, in some embodiments, to avoid problems such as packet reordering, it may be desirable to select move-eligibility criteria that increase the likelihood that traffic from a given flow will always proceed along the same route.

One way to redirect a fraction of traffic flows in this manner is to maintain a per-flow path selection state to track flows that are to be redirected. Thus, once an initial decision has been made to redirect the flow, the path selection state may subsequently be consulted to determine how to handle other packets in the flow.

In some embodiments, however, the cost of maintaining a path selection state for each of, potentially, millions of flows can be avoided. For instance, the move-eligibility decision may be made using a function of information within each packet that predictably selects the same result for each packet in a flow. One example of a suitable function is a hash function based on certain header fields within the packet that would be the same for each packet in the flow. This hash function, which is different than the hash function used to select the primary path, computes a hash value for each packet. If the hash value is within a set of 'move-eligible' values, the packet is marked as being 'move-eligible.'

Further examples of move-eligibility criteria are described in other sections. Note that the use of move-eligibility criteria to decide when a packet is eligible to be moved from a primary path to an alternative path may be utilized in any path selection technique, including techniques that do not involve multiple path selection groups or secondary paths. Move-eligibility criteria may furthermore serve as the sole criteria for deciding when to move traffic from a primary path to an alternative path, in an embodiment.

Criteria for Assigning a Secondary Path

In an embodiment, certain triggering conditions may cause the node to assign a packet to a selected secondary path instead of the primary path. For instance, in an embodiment, the current quality level of the selected primary path (or some other suitable metric from the path state information) is compared to a threshold. If the quality level does not meet the threshold (i.e. falls below, exceeds, or is otherwise outside of an acceptable level), a secondary path selected from the secondary set may be assigned instead of the primary path.

The threshold may be global for all primary paths, specific to the selected primary path, specific to the destination, or specific to some attribute of the path (such as port bandwidth). The threshold may be constant, or variable based on historic path information, the relative states of other primary paths, and so forth.

In an embodiment, a selected secondary path is always assigned when the threshold for the primary path is not met.

In other embodiments, failure of the primary path to meet the relevant threshold is merely one condition necessary for assignment of the secondary path. Another condition may be that the secondary path meets a relevant threshold for the secondary path, which again may be global or specific, and constant or variable. In one embodiment, the relevant threshold is simply that the secondary path provides a better quality level than the primary path. The threshold, in some embodiments, may be a dynamic value that changes based on observed state. Whatever the threshold may be, if the secondary path also fails to meet its relevant threshold, then either the primary path is assigned, or an alternate path may be assigned, depending on the embodiment.

In an embodiment, even when both the primary path fails to meet its relevant threshold and the secondary path meets its relevant threshold, packets may be routed to a secondary path only some percentage of the time (e.g. when move-eligibility criteria are met). For instance, a random or scheduled sampling of packets may be routed to the secondary path so as to meet the designated percentage. Like the threshold, the percentage may be global for all paths, or specific to the path, destination, or some attribute of the path (such as port bandwidth). The percentage may likewise be constant, or variable based on historic path information, the relative states of other paths in the primary group, and so forth.

Criteria for Assigning Paths from Alternate Groups

In some embodiments, an alternate candidate path from an alternate group may be assigned instead of a primary path and/or secondary path, under any of a variety of triggering conditions. For instance, in embodiments that include secondary path candidate selection logic, an alternate candidate path from an alternate group may be selected when the quality level of the secondary path for the primary group does not meet some threshold, similar to the manner in which the quality level of the primary path may have triggered assignment of the secondary path. That is, if the states of both the primary path and the secondary path do not meet some threshold condition(s), the alternate path may be used.

As with secondary path assignment, the alternate path may always be used under these circumstances, or only used when some additional condition(s) are met. When the relevant conditions are not met (e.g. if the quality level of the alternate path is below some threshold), the primary path may be reverted to.

In an embodiment, no secondary path is selected for the primary group. The state of the selected primary path instead determines when to assign an alternate candidate path from the alternate group, in the same manner described with respect to assignment of a secondary path.

In an embodiment, the collective state of the paths in the primary group may determine when to assign an alternate candidate path from an alternate group, regardless of whether a secondary path is selected for the primary group. For example, when a collective metric for the primary group of paths as a whole, such as an average quality level across all states, fails to meet some threshold, packets may be assigned to an alternate candidate path from an alternate group either automatically or some percentage of the time. Depending on the embodiment, this assignment may occur without regard to the individual state of the primary path that would have been selected, and/or without regard to move-eligibility criteria.

In an embodiment, an alternate candidate path from an alternate group may instead take priority over a secondary path in the primary group. That is, a secondary path may be selected from the primary group only after first checking whether the selected alternate path meets its relevant condition(s).

Other Considerations

In yet other embodiments, assignment of a secondary or alternate candidate path occurs without consideration of the state of the of the primary path. Instead, the node may be configured such that a candidate path other than the primary path will always be chosen some fixed or variable percentage of the time. For instance, the selected secondary or alternate candidate path may be assigned any time move-eligibility criteria are met.

3.5. Sliding Windows

In an embodiment, a hash-function-based determination of the eligibility of a packet to be redistributed to a non-primary path may be enhanced using sliding windows of hash value eligibility ranges. That is, the move-eligibility logic may define a percentage of flows to move by selecting a range or other set of values within the hash value number space to map to a positive move-eligibility determination.

Suppose, for example, the hash function used for move-eligibility has an output range of [0, 255]. One may move five percent of the traffic flows by mapping all flows whose hash value is in the range of [0, 12] to an alternative candidate path. This yields a theoretical redistribution rate of 5.08%. Alternately, multiple ranges may be used to address any statistical concerns with a single fixed range. For example, again suppose the output range is [0, 255]. One may move 5% of the flows by mapping all flows whose hash value is in the ranges of [4, 8] and [200,207] to an alternative candidate path.

Moreover, in an embodiment, additional values or ranges may be added to the subset of move-eligible hash values over time in response to detecting increases in the congestion level, and removed as congestion decreases. In an embodiment, to reduce packet reordering and/or other issues, changes to the move-eligible values may be made only at designated times (e.g. the start of each epoch).

Among other advantages, this sliding window technique may allow for micro-targeting of subsets of flows for traffic distribution improvements. Traffic distribution performance may gradually be improved by remapping flows. The technique may even achieve this benefit without requiring stored path state information to improve performance. For instance, the technique may just be performed based on state information observed at the network level.

3.6. Learning-Based Adaptive Move-Eligibility

According to an embodiment, multiple hash functions are available to the move-eligibility logic to utilize in determining whether packets are move-eligible. Different functions may be used at different times to achieve a more balanced distribution of traffic. For instance, a different hash function may be chosen for identifying move-eligibility at the beginning of each epoch. By waiting to change hash functions until the expiration of an epoch, one may minimize flow reordering problems that may occur from changing the function used to select a path, assuming the epoch is of practical length. In an embodiment, the number of active flows that would be remapped may even be a condition considered when determining when an epoch occurs, or what function is used for the next epoch.

In an embodiment, the selected hash function may be group-specific. Thus, for example, different hash functions may be used for different groups of packets (e.g. packets targeting a specific destination) during the same epoch. However, in other embodiments, the hash function is selected on a global basis. Thus, for example, a single hash function may be used for all packets during the same epoch.

Figure 5:
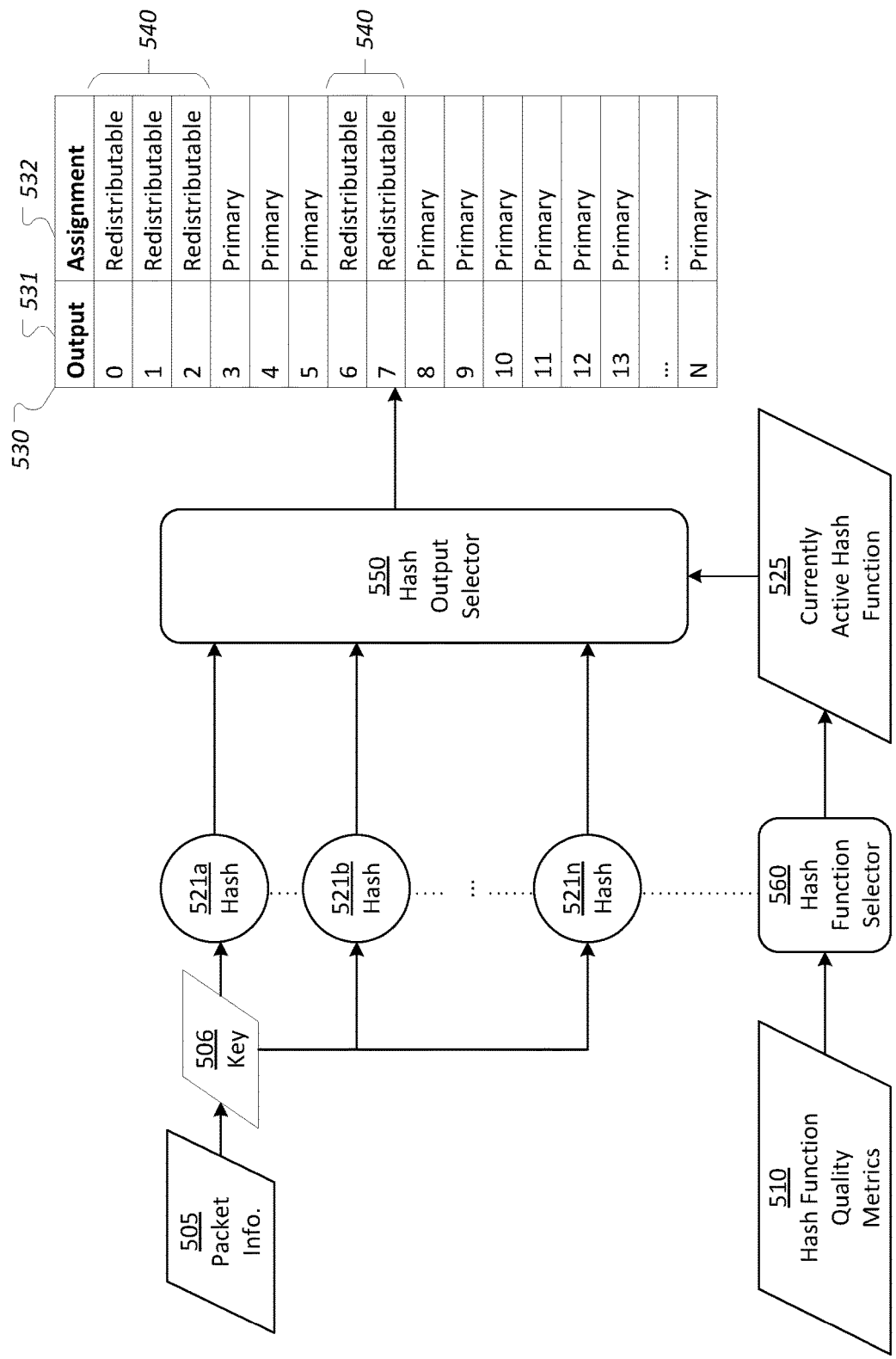
FIG. 5 illustrates example logic suitable for determining move-eligibility utilizing multiple different hash functions.

FIG. 5 illustrates example logic 500 suitable for determining move-eligibility utilizing multiple different hash functions 521, according to an embodiment. Logic 500 may, for example, be utilized as move-eligibility logic 350 in FIG. 3. Logic 500 may also be utilized in a variety of other contexts. The various components of move-eligibility logic 500 may be implemented by, for example, one or more FPGAs, ASICs, or other integrated circuits. In an embodiment, some or all of the elements of move-eligibility logic 500 may be implemented by a general purpose processor executing software-based instructions.

Logic 500 derives a key 506 from packet information 505. Packet information 505 may be, for instance, the same as or similar to packet information 305. Key 506 may include or be derived from all of the packet information 505, or only a selected portion, such as a set of header fields. Key 506 is input into at least one of hash functions 521a-n, collectively hash functions 521. There may be any number of hash functions 521, including two or more.

Each executed hash function 521 outputs a hash value. A hash output selector 550 selects which of the outputs to use as an index 531 for locating a value 532 mapped to the key 506 by mapping data 530. While mapping data 530 is depicted as a table, it will be noted that any other suitable structure may be utilized. The value 532 located at the identified index 531 is output from the logic and the input into another coupled component, such as a path selection logic. The depicted values 532 include primary and redistributable indicators, indicating whether a primary path should be assigned, or whether an alternative candidate path may be assigned. The indexes 531 corresponding to the redistributable indicators are thus said to form a "sliding window" 540 of move-eligibility, or a set 540 of "move-eligible values." An external component, not depicted, may adjust which of the indexes 531 are redistributable based on various factors, as described in other sections.

To determine which hash output to select, hash output selector 550 is configured to read or receive an indicator of the currently active hash function 525 from a hash function selector 560. The currently active hash function 525 may be globally selected, or specific to a group to which the packet information 505 belongs. In the latter case, hash output selector 550 may utilize information within packet information 505 to identify the relevant group for the packet information 505, and specifically request or read the currently active hash function 525 for that group.

In an embodiment, key 506 is input into all hash functions 521 simultaneously, which then calculate their respective hash values based on key 506. Thus, hash output selector 550 operates as a switch, selecting one of multiple inputted hash values to utilize. In an embodiment, on the other hand, only the currently active hash function 525 is executed. Thus, hash output selector 550 is configured to control which of hash functions 521 receives the key 506 and/or is executed.

Hash function selector 560 selects the currently active hash function 525 based on hash function quality metrics 510. Hash function quality metrics 510 indicate collective measures of quality for all paths known to the implementing network device, and/or for specific groups of paths, during specific intervals in time when specific hash functions 521 were active. Each collective measure may be any suitable measure, such as a measure of average congestion or delay, or measure calculated using a function thereof. The measure is calculated based on various statistics collected over time, such as described in other sections. A collective measure may, in an embodiment, be based at least in part on a statistical or other function, such as a standard deviation, that indicates whether one or more of the paths are overloaded relative to other paths. A collective measure may be weighted, such that older collected statistics impact the measure less.

Hash function selector 560 may use the collected statistics to identify an optimal hash function to select at a given time for a given group of paths. Since the performance of a hash function is not known initially, and may change over time, various learning techniques may be utilized in selecting an active hash function, as described in other sections.

In an embodiment, to conserve resources and/or avoid packet re-ordering, the hash function selector 560 is configured to select the active hash function for a group only at the start of predefined intervals of times (e.g. epochs), or only the first time a packet belonging to the group for which the active hash function is being selected is encountered during an interval. The hash function selector 560 may thus write information indicating the currently active function(s) 525 to memory, from which the information may be read by hash output selector 550. In another embodiment, hash output selector 550 always requests that hash function selector 560 select the active hash function 525 for the packet information 505 currently being processed. Hash output selector 550 may cache information indicating the currently active hash function(s) 525 and return the cached information, or determine a new active hash function 525.

FIG. 5 illustrates but one example of a component configured to determine whether a packet is move-eligible, or redistributable from a primary path to an alternative path. Other components may include additional, fewer, or different elements in potentially varying arrangements. For example, in an embodiment, only one hash function 521 may exist, and thus elements 510, 525, 560, and 550 may be omitted.

More generally, logic 500 may be utilized for mapping any information to a range of values. Packet information 505 may be any other suitable information from which a key 506 for executing hash functions 521 may be derived. Column 532 may hold values for any suitable purpose. Hash function quality metrics 510 may reflect any suitable quality metric whose values may be impacted by the choice of hash function 521. For example, logic 500 may be utilized to make other forwarding decisions for a packet, such as selecting a path, classifying the packet, and so forth, with the outputted value indicating the decision to be made.

Hash Function Selection Strategies

Hash function selection strategies that may be used, for example, by a hash function selector 560, or in other contexts, are now described. A new hash function may be selected at the start of each epoch, or only at the start of certain epochs. In an embodiment, a new hash function is selected at random. In an embodiment, a new hash function may also or instead be selected based at least in part on a measure of the quality of the function. That is, path state information collected while using the function previously may be used to calculate a metric, referred to as a group quality measure, that reflects the impact of the function across multiple path states. Each function may result in a different group quality measure, and the group quality measure may change over time.

Generally, it is desirable that the best function should be used, but in practice the optimal function is unknown at a beginning time, and may further change over time. Thus, a hybrid selection approach may be used to select the function, balancing the need for exploration of the quality of other functions versus the need for exploiting the function that currently has the highest known quality. An exploration approach will be used some percentage of the time. For example, a new function may be selected at the beginning of an epoch based on probability (either configured or based on an exploration function). An exploitation approach will be used the remainder of the time. For example, the best function may be selected at the beginning of an epoch (or after n epochs) based on collected group quality state.

The frequency with which the exploration approach is utilized, as opposed to the exploitation approach, may be selected on a global or per-group basis, based on network attributes and performance targets. Moreover, the frequency may change over time. For instance, as group quality measures tend to converge towards an optimal function, the exploration approach may be used less and less frequently. Or, if the group quality measures begin to deviate significantly from historic averages, the exploration approach may be taken more frequently to attempt to discover a new optimal function.

For example, an exploration threshold may be set to be a high level at the beginning of time, but lowered (by either software or hardware) as the group quality measure approaches a group quality target. Conversely, the exploration threshold may be increased if the group quality falls below the group quality target.

3.7. Serial Versus Parallel Selection

Depending on the embodiment, paths may be selected using the respective path selection logics serially and/or in parallel. When executed serially, assuming any move-eligibility criteria are met, the failure of one selected path to meet its respective quality conditions triggers execution of the next highest priority selection logic to select another path. When executed in parallel, each type of implemented candidate selection logic is performed in parallel, and the move-eligibility criteria (if implemented) and various quality conditions control which of the selections is ultimately assigned, rather than whether the selection logic will be executed. Note that embodiments may involve a strictly serial sequence of selections, a strictly parallel selection process, or combinations of the two.

For example, the primary path candidate selection logic may be implemented serially or in parallel with respect to a secondary path candidate selection logic and/or the alternate selection logic. In one embodiment, a secondary path candidate selection logic may only be used if secondary selection triggering conditions are met, and an alternate path candidate selection logic may only be performed if the alternate selection triggering conditions are met. Hence, the secondary path candidate selection logic and/or alternate path candidate selection logic may not be executed the majority of the time, when the selected primary path is assigned.

In another embodiment, however, the secondary path candidate selection logic and/or the alternate path candidate selection logic may always be executed with the primary path selection logic in parallel. For instance, the implementing hardware may be configured to implement all candidate selection logics in parallel, with respect to, potentially, any number of secondary paths or alternate groups.

3.8. Example Architectures

The following examples illustrate various embodiments in which the described techniques may utilized. The embodiments are merely examples of the many ways in which the mechanisms described in this disclosure may be arranged to enhance the path assignment process.

Duplicate Path Tables

In an embodiment, a primary group of paths is described by a path table. This table is duplicated for use by multiple, parallel implementations of the path candidate selection logic, each utilizing a different function to select an index from the table. The multiple, duplicate path tables are in effect utilized to perform k parallel selections, resulting in the selection of k possible path candidates to which a packet may be assigned. It will be appreciated that k may be any number higher than 1. A primary selection is made using a primary selection approach, and each remaining selection produces an alternative candidate path that is essentially a secondary path within the framework of the foregoing description.

Path status information is kept for each path in the table, thereby allowing for determinations of whether a selected primary path candidate has low path quality. If the selected primary candidate has low path quality, an alternate candidate may be used if certain move-eligibility criteria are satisfied.

State-Based Secondary Tables

In an embodiment, a state-based secondary table approach is utilized. A primary table and one or more secondary tables are maintained for a primary group of paths. Within the context of the foregoing framework, the primary table describes a primary group of paths and the secondary table describes a secondary set of the paths in that primary group.

The secondary table(s) may, for cost savings purposes, store potentially fewer members than are provided for the primary table/set. For instance, entries in a secondary table may contain only the optimal set of members within the primary group of paths (e.g. from 0..j, where j is less than the total members in the primary group).

Entries in the secondary table may be updated by, for instance, dedicated hardware, using path/group state information provided by a path state information component. Alternatively, entries in the secondary table may be updated by software based, potentially, on path/group state information provided by the path state information component.

Candidate paths are selected from the secondary table using one or more orthogonal hash function (relative to the hash function used to select the primary path). Both the primary selection and secondary selections are provided to the path assignment process in parallel, and assignment proceeds using techniques such as described above.

Combined Primary-Secondary Table

According to an embodiment, both a primary path and a secondary path may be selected using a single function from a combined primary-secondary path table. Each path table entry contains a primary selection and one or more alternate selections. All selected candidates are provided to the path selection process for resolution, using the techniques described herein. Among other advantages, this architecture makes more efficient use of memory space, with lower complexity in the selection logic. On the other hand, other architectures may perform better in contexts where hash polarization issues arise, such as if the single hash function tends to bias traffic away from some entries toward other table entries.

Multi-Group Path Distribution

In an embodiment, multiple path candidate selection functions, as described in previous sections, may be used to select paths from multiple groups in parallel. Each group is a separate set of paths to the destination. Depending on the embodiment, the paths in some or all of the groups may be the same, partially overlapping, or completely different. For example, a first group (the primary group) may consist of members that represent the shortest paths (or a subset of the set shortest paths), while a second group (an alternate group) may consist of members that represent the non-shortest paths.

Path candidate selections are performed independently for each group in parallel, with a final assignment performed based on one or more of: priorities assigned to the groups, quality levels of the selected candidate paths, and/or the results of a move-eligibility function, as described in other sections.

Figure 6:
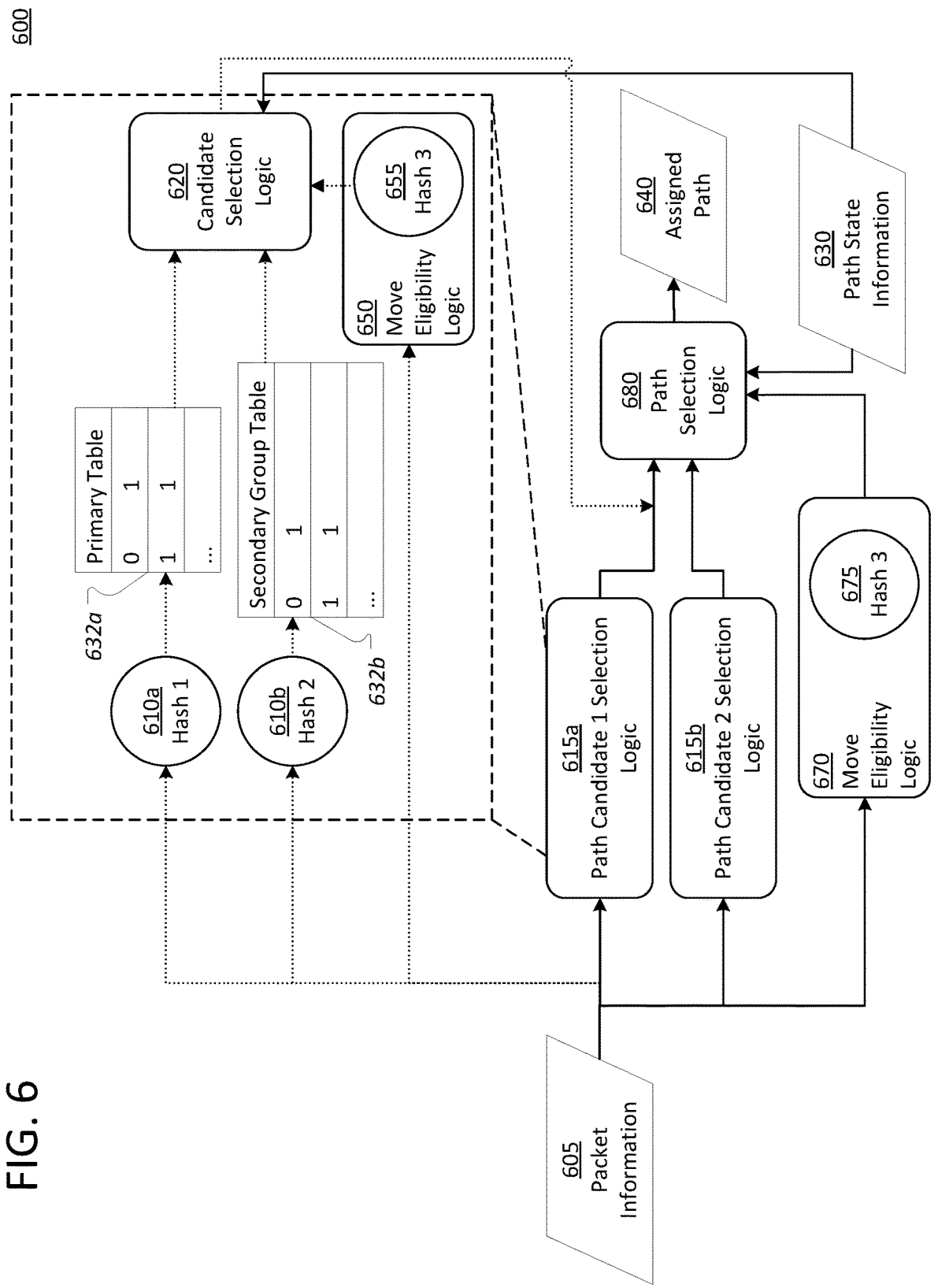
FIG. 6 illustrates an example system in which a multi-group path candidate selection process may be implemented.

FIG. 6 illustrates an example system 600 in which a multi-group path candidate selection process may be implemented, according to an embodiment. System 600 is an example of a path assignment subsystem 280, according to an embodiment. Packet information 605, the same as or similar to packet information 305, is passed into two different path candidate selection logics 615, each configured to output a single candidate path to path selection logic 680. In an embodiment, each path candidate selection logic 615 may comprise multiple mechanisms for selecting a candidate, thus resulting in a tiered candidate selection system.

For instance, as depicted, path candidate selection logic 615a comprises two hash functions, 610a and 610b, into which the packet information 605 for a packet may be inputted. Hash functions 610a and 610b may be the same, or different, depending on the embodiment. Each hash function 610 outputs a value that selects an entry in a corresponding path table 632. Path table 632a is a primary path table, and hash function 610a selects what is considered the primary candidate path from primary table 632a. Path table 632b is a secondary group table, comprising a subset of the paths for the relevant path group. Hash function 610b selects what is considered the secondary candidate path from secondary group table 632b.

Both selected paths are then presented to candidate selection logic 620, which chooses one of the two paths as the candidate to output from path candidate selection logic 615a. Candidate selection logic 620 may use any of the foregoing path assignment techniques to choose between the primary candidate path and the secondary candidate path. For instance, candidate selection logic 620 may read and/or request path state information 630 to identify quality states for the two presented paths, and use this information to decide which path to select.

Also, path candidate selection logic 615a may include move-eligibility logic 650. Move-eligibility logic may utilize a hash function 655, which may be the same as or different from hash functions 610, to determine, based on packet information 605, whether the currently evaluated packet is redistributable. Candidate selection logic 620 may then use this determination to choose between the two paths, as described in other sections.

Meanwhile, in an embodiment, path candidate selection logic 615b is arranged in the same manner as path candidate selection logic 615a, but with respect to an alternate group table and secondary alternate group table as opposed to primary table 632 and secondary group table 634. In such an embodiment, the hash functions utilized by path candidate selection logic 615b may be the same as or different than the hash functions 610 utilized by path candidate selection logic 615a. In another embodiment, path candidate selection logic 615b may utilize any other suitable selection approach to select a candidate to output to path selection logic 680.

Path selection logic 680 selects one of the candidates output by the candidate selection logics 615a as the path 640 to assign to the packet. Similar to path selection logic 620, path selection logic 680 may use any suitable approach to select between candidate paths. To this end, path selection logic 680 may also read or receive path state information 630. Moreover, system 600 may include another move-eligibility logic 670 that makes a move-eligibility determination for path selection logic 680. Move-eligibility logic 670 may be the same as move-eligibility logic 650, or different, depending on the embodiment.

System 600 is but one example of a path assignment subsystem capable of selecting paths from multiple groups. Other systems, including other tiered systems, may comprise fewer or additional components in varying arrangements. For example, in an embodiment, there may be three or more tiers of candidate selection. In an embodiment, there may be more than two candidate selection logics 615, each acting on a different path group. In an embodiment, move-eligibility logic 650 and/or 670 may be omitted. In an embodiment, there may be more than two hash functions 610. Yet other variations are also possible.

4.0. Redistribution Policy Engine

Among other suitable mechanisms for applying traffic redistribution techniques such as described herein, in some embodiments a policy mechanism may be utilized for governing the redistribution of traffic belonging to a multi-pathing group based on measured state.

The policy mechanism may be implemented by a redistribution policy engine. In general, the redistribution policy engine determines, for a given message, whether the message should be redistributed from a primary path to an alternate path. In one embodiment, the redistribution policy engine may do this by determining: (a) a percentage of traffic (i.e. messages or flows) to be redistributed, (b) group(s) of flows that compose that percentage, and (c) whether a given message belongs to one of these group(s) of flows. For instance, the redistribution policy engine may be configured to make a move eligibility determination such as described above.

Figure 10:
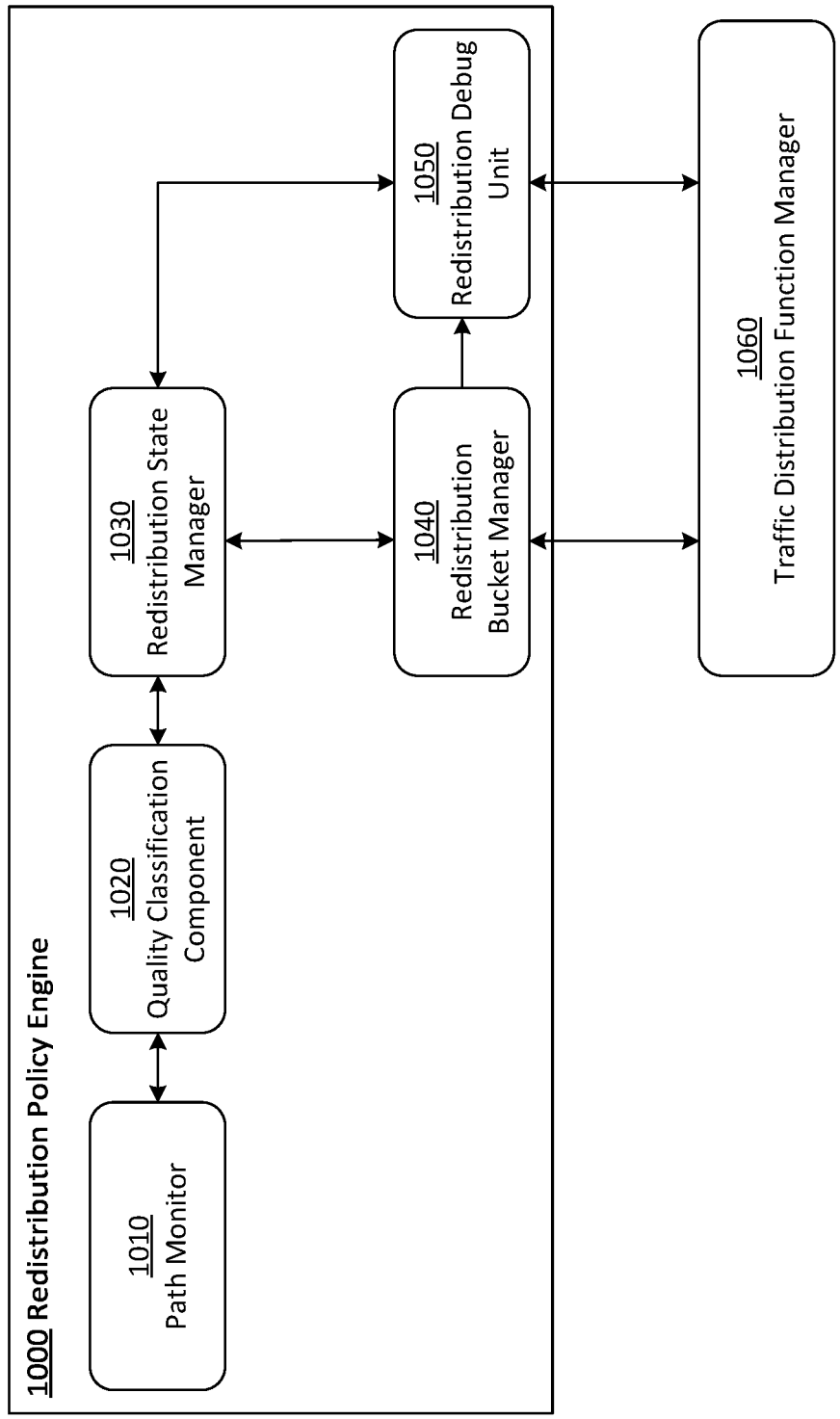
FIG. 10 illustrates an example redistribution policy engine.

FIG. 10 illustrates an example redistribution policy engine 1000, according to an embodiment. Redistribution policy engine 1000 may be implemented by, for example, a networking computing device, such as a router or switch. In an embodiment, some or all of the components of redistribution policy engine 1000 described herein are implemented using application-specific integrated circuits (ASICs) or field programmable gate arrays (FPGAs). In an embodiment, a computing device may include one or more memories storing instructions for implementing various components of redistribution policy engine 1000 described herein, one or more hardware processors configured to execute the instructions stored in the one or more memories, and various data repositories in the one or more memories for storing data structures utilized and manipulated by the various components. Redistribution policy engine 1000 may, in some embodiments, be an example of move eligibility logic 350 in FIG. 3. In other embodiments, redistribution policy engine 1000 may be utilized in contexts other than the system depicted in FIG. 3.

The redistribution policy engine 1000 may comprise some or all of the following components. The redistribution policy engine 1000 may include, for example, a path monitor 1010, configured to determine path states by using various metrics calculated based on collected path state information. The redistribution policy engine 1000 may further include, for example, a quality classification component 1020, configured to determine the quality of paths and/or groups of paths based on metrics collected by the path monitor. The redistribution policy engine 1000 may further include, for example, a redistribution state manager 1030, configured to determine redistribution states, either for a given group and/or path, or on a global basis. These states may directly or indirectly indicate a percentage of traffic that should be redistributed. The redistribution policy engine 1000 may further include, for example, a redistribution bucket manager 1040, configured to specifies set(s) of values ("redistributable values") that indicate that a given message should be redistributed to an alternate path. These values may be utilized by a traffic distribution function manager 1060 to select between multiple functions for distributing traffic amongst the various paths. Finally, the redistribution policy engine 1000 may further include, for example, a redistribution debugging unit 1050, configured to specify any actions to be taken to facilitate debugging of redistribution events.

4.1. Metrics

A path monitor 1010 may track and compute various metrics with respect to the collected path state information, with some example metrics including, without limitation: port loading, port delay (in seconds), queue delay (in seconds), queue length (in packets or bytes), port length (in packets or bytes), total number of packets or bytes enqueued to the port, or path imbalance. In an embodiment, a path monitor 1010 may measure the metrics, for both individual ports/paths and/or groups of ports/paths, for the duration of a specific time interval, such as an epoch ($\epsilon$).

In an embodiment, the quality classification component 1020 may utilize metrics to update the quality of a path and/or a group of paths. Quality may be indicated, for example, by a numeric value that is computed using a quality classification function. The quality classification component 1020 transforms one or more of the metrics into a single numeric value that can be used to compare the relative states of paths within a group and/or the relative states of disparate groups. As such, the output of the quality classification component 1020 may be a set of group quality values, representing the quality of each group, and/or path quality values, representing the quality of each path belonging to a given group. The quality classification component 1020 may be configured to compute the quality values on demand, or once each epoch, after the relevant metrics have been measured for the epoch.

4.2. Redistribution States

In an embodiment, based on the metrics and/or quality values, a redistribution state manager 1030 calculates a set of computed path redistribution states and/or group redistribution states. The redistribution states are updated over time as the quality of the corresponding paths change, as indicated by the quality values and/or metrics.

In an embodiment, the path redistribution states and/or group redistribution states are set to an initial value that indicates good quality, under the assumption that all paths have good quality. The path redistribution states and/or group redistribution states remain at that value for the duration of an initial epoch. At an epoch boundary (end of the current epoch or beginning of the next epoch), the redistribution state manager 1030 receives path quality values and/or group quality values which are combined with the current path redistribution states and/or group redistribution states to determine updated path redistribution state and/or group redistribution state values for the next epoch.

The determination of updated path redistribution state and/or group redistribution state values is performed by a configurable mapping function in the redistribution state manager 1030. In an embodiment, an example policy may be configured to configured to calculate the path redistribution state and/or group redistribution state values based on path quality values and/or group quality values from a recent period of time rather than simply based on the path quality value and/or group quality value of the most recent epoch. Such a policy may be enacted to prevent dramatic redistribution changes whenever quality improves significantly.

In embodiments where the percentage of traffic to redistribute is variable, the percentage may be determined in a variety of manners. For example, the percentage of the flows to be redistributed may be determined based on the path redistribution states and/or group redistribution states. For instance, the percentage for a given path or group may be based on a function or table of path redistribution states and group redistribution states, such that the lower the quality of a path or group, the higher the percentage of traffic redistributed away from that path or group. In an embodiment, the group redistribution state and/or path redistribution state values are provided to a redistribution bucket manager 1040, which calculates the relevant redistribution percentages for each port or group based thereon. In another embodiment, the redistribution percentage may be calculated by the redistribution state manager 1030 or otherwise identified, and then fed to the redistribution bucket manager 1040.

4.3. Redistributable Values

A given message may be processed by a traffic distribution function manager 1060 to decide whether the message should be assigned to a first path that has been selected for the message (e.g. the primary path), or redistributed to an alternate path (e.g. selected using secondary or alternate selection logic). To make this determination, or as a step in making this determination, the traffic distribution function manager 1060 may decide whether a message is redistributable (e.g. "move-eligible").

In an embodiment, the traffic distribution function manager 1060 may make this determination for a message once. For instance, the traffic distribution function manager 1060 may just determine whether the message is redistributable from a primary path, or a primary group of paths. In an embodiment, the traffic distribution function manager 1060 may make this determination once for each group with respect to which a path is to be selected. For instance, if there are multiple alternate groups, the traffic distribution function manager 1060 may decide, for each alternate group, whether the message should be redistributed from the selected alternate path in that group to a secondary path within that group, or whether the message should be redistributed from the selected alternate path in that group to a path selected from a different alternate group. In yet another embodiment, for each path that is selected for a message (e.g. for primary paths, secondary paths, and/or alternate paths), the traffic distribution function manager 1060 may be configured to decide whether the message is redistributable from that path.

In an embodiment, to determine whether a message is redistributable, the traffic distribution function manager 1060 may process the message using a redistribution function, and compare the output of that function to identified sets of redistributable values. For instance, the redistribution function may be a hash function which returns a hash value. Meanwhile, the redistribution bucket manager 1040 is configured to identify sets of values ("redistributable values) that correspond to a determination to redistribute the message. If the redistribution function output is a value that the redistribution bucket manager 1040 has identified as indicating that the message is redistributable, the traffic distribution function manager 1060 marks the message as redistributable. For instance, the redistribution function may be the move-eligibility function described in previous sections. In this context, the redistribution bucket manager 1040 may be configured to implement sliding windows as described above.

The redistribution bucket manager 1040 may identify different sets of redistributable values for different groups and/or different paths. For instance, the redistribution bucket manager 1040 may indicate that a redistribution function output range of 50-100 is redistributable when applied to paths selected from a primary group, or when a first path has been selected for the message, while the redistribution bucket manager 1040 may indicate that only the range of 70-90 is redistributable when selecting a path from an alternate group, or when a second path has been selected for a message.

4.4. Redistribution Buckets

In an embodiment, the redistribution bucket manager 1040 may identify these redistributable values using logic based on constructs referred to as a redistribution buckets. Each redistribution bucket is mapped to a different range (or set) of outputs of a redistribution function, such as hash values in embodiments where a hash function is used as a redistribution mechanism. A bucket may be enabled to indicate that values within the bucket are redistributable. Buckets may be disabled to indicate when no remapping should occur for the ranges specified in the bucket. Buckets may also specify null ranges.

The exact mapping of buckets to values may be predefined, or controlled programmatically. In an embodiment, bucket profiles may be defined that describe different mappings of buckets to values. Each group and/or path may be assigned a bucket profile. Some groups or paths may have the same bucket profile, while others may have different bucket profiles. In an embodiment, the bucket profile may change over time. For instance, redistribution bucket manager 1040 may select the current bucket profile for a group or bucket based on its current path redistribution state or group redistribution state value.

In an embodiment, a transform function may be applied in addition to a bucket profile. A bucket profile may indicate a base set of range-to-bucket mappings. For instance, the profile may indicate that values 0-15 map to bucket 1, values 16-21 to bucket 2, and so forth. The transform function may indicate that, for a given group, the range mapped to a given bucket should be offset by a certain amount, expanded, or otherwise transformed in accordance to a specified function. For instance, the transform function may indicate that the ranges should be offset by 5, and hence values 5-20 map to bucket 1, values 21-26 to bucket 2, and so forth. Different transform functions may be selected for different paths and/or groups, such that two paths or groups with the same bucket profile would nonetheless have different ranges mapped to different buckets. The transform function for a given group or path may be random, pre-defined, a function of some attribute of the group or path, and/or a function of metrics such as path redistribution state or group redistribution state.

In an embodiment, the enabled (redistributable) buckets for a group or path may be selected so as to ensure that the number of redistributable values for the group or path divided by the total number of redistribution function outputs reflects the current redistribution percentage for the group. In an embodiment, the enabled buckets may themselves be specified by the bucket profile. In an embodiment, the number of enabled buckets is a direct function of the relevant path redistribution state or group redistribution state value. It will be recognized that for certain embodiments, a redistribution percentage need not be explicitly calculated by the redistribution bucket manager 1040 or redistribution state manager 1030, but rather the composition of the enabled buckets and associated bucket ranges configured for a given path redistribution state or group redistribution state simply reflects the relevant redistribution percentage.

4.5. Redistribution Debugging

The redistribution policy engine 1000 may also optionally contain a redistribution debugging unit that maintains statistics and indicates any actions that should be taken whenever a flow should be redistributed. Example statistics include, without limitation: number of redistribution events, average quality (paths and/or groups), peak quality (paths and/or groups), minimum quality (paths and/or groups), average redistribution state (paths and/or groups), peak redistribution state (paths and/or groups), minimum redistribution state (paths and/or groups), and so forth.

One example action that the redistribution debugging unit may trigger is, without limitation, annotating a packet that is being redistributed to an alternate path or path group. The annotation process may use In-Band Network Telemetry or any other annotation framework, such as simply setting specific bits in the packet. Since a message may be redirected multiple times, by multiple nodes, as it traverses a network, annotations may be specified on a per-node basis and/or on a summary basis for all redirecting nodes. An annotation may specify, for example: a node ID of a node at which the message was redistributed (e.g. a switch ID, router address, etc.), statistics such as debug statistics or path state metrics, identifiers for selected paths, a total number of times the message was redirected along an alternate path (e.g. non-shortest path, redundant path, spillover path, etc.), a total number of times the message was redirected along an optimal path (e.g. shortest path), and so forth.

4.6. Miscellaneous

Note that the redistribution policy engine 1000 may be used to decide when to redistribute path assignments in a variety of contexts, and not just within the context of the group-based reassignment mechanisms described herein. For instance, the redistribution policy engine 1000 may be used to decide when to redistribute traffic assignments made by any path selection mechanism to alternate paths. The selected alternate path may be fixed, determined by an alternate hash function, or determined based on any other function or mapping.

It will be recognized that a redistribution policy engine need not comprise all of the features of redistribution policy engine 1000 described herein. For instance, various embodiments may omit the use of metrics and/or states in deciding on redistributable values. As another example, some embodiments may utilize constructs other than redistribution buckets to identify redistributable values. For instance, a bucket profile may simply be a bitmap of the values, with a value of 1 indicating which values are redistributable. Yet other embodiments need not include bucket profiles and/or transform functions. Moreover, the same techniques may be implemented by hardware or software in which the division of work may not necessarily be distributed amongst the same types of components as described herein. These and other variations are within the scope of this disclosure.

5.0. Example Process Flows

5.1. Path Assignment

Figure 7:
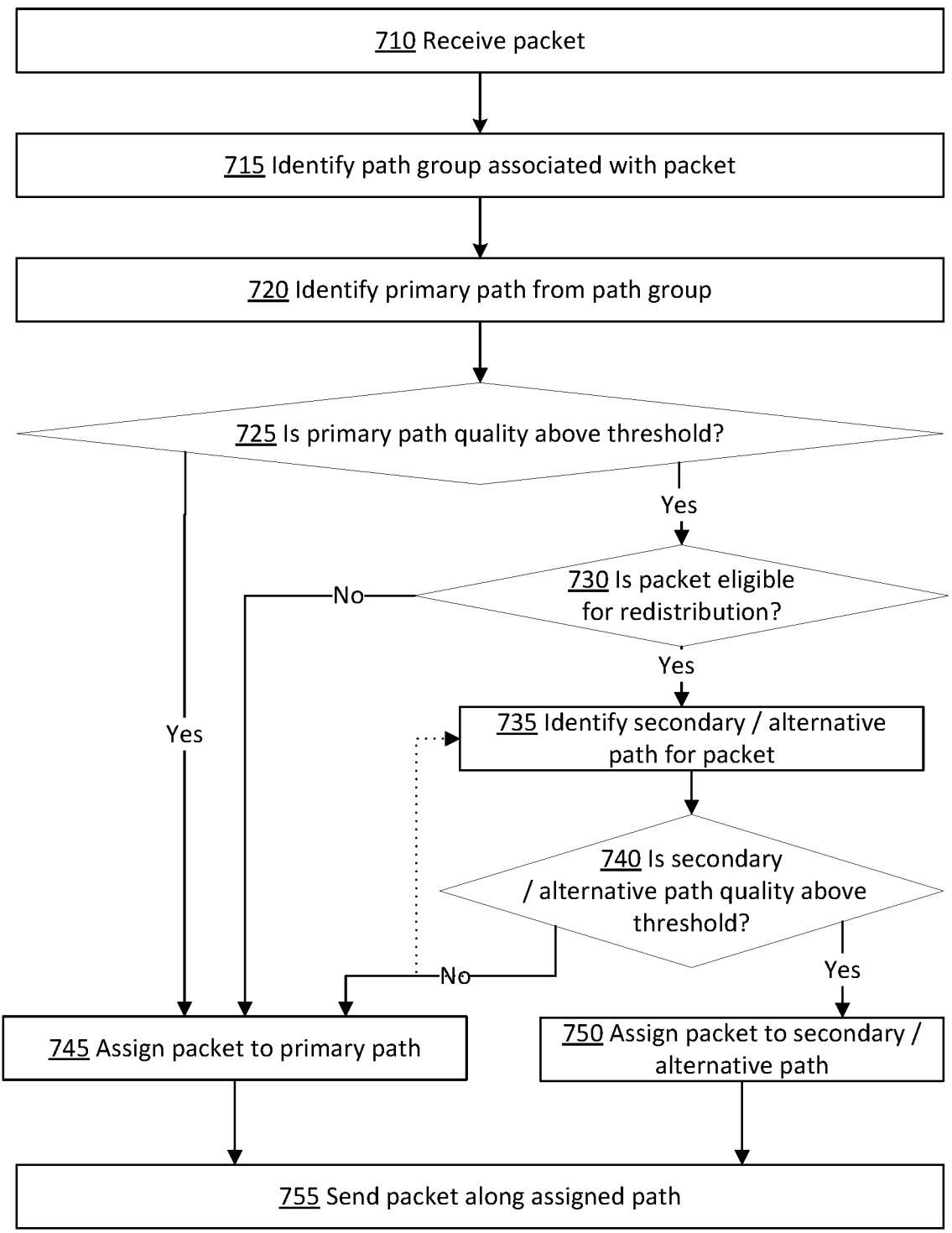
FIG. 7 illustrates an example flow for assigning a path to a packet.

FIG. 7 illustrates an example flow 700 for assigning a path to a packet, according to an embodiment. The various elements of flow 700 may be performed in a variety of systems, including systems such as system 100 and/or 200 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 710 comprises receiving a packet, such as a packet 205, at a network device. Block 715 comprises identifying a path group associated with the packet. In general, identifying a path group for a packet comprises identifying information within the packet that indicates the group, either directly, or via a mapping maintained by the network device. For instance, identifying the path group may comprise identifying a destination address of the packet, finding a longest prefix match for the destination address within a prefix table, and identifying a path group associated with that prefix. The path group may be any suitable group of paths, though in an embodiment, the path group is a group of optimal and/or topographically shortest paths.

Block 720 comprises identifying a primary path for the packet from the path group, using primary path selection logic such as described elsewhere herein. For instance, block 720 may be executed by a primary path candidate selection mechanism such as primary path candidate selection logic 310a. In an embodiment, an ECMP or WCMP approach is used to select the primary path.

Conventionally, the packet would automatically be assigned to this primary path. However, according to the techniques described herein, flow 700 proceeds to block 725. Block 725 comprises determining whether the primary path quality is above a certain threshold. The primary path quality may be a measure of congestion, a measure of delay, or any other suitable quality measure. As described elsewhere, the primary path quality may be calculated from statistics collected from internal and/or external mechanisms, such as reflection, annotation, queue or buffer tracking, and so forth. The threshold may be a predefined threshold, which may vary depending on the embodiment, device, and/or configuration settings. In an embodiment, the threshold may be relative to other paths and/or change over time based on the states of other paths. In an embodiment, a path whose quality is not above the threshold is considered to be in a low-quality state.

If the primary path quality is not in a low-quality state (e.g. above the threshold), then in block 745 the packet may be assigned to the primary path. In block 755, the packet may thus be sent along the assigned path (e.g. forwarded to a queue associated with the egress port that is associated with the path).

However, if the primary path quality is in a low-quality state (e.g. below the threshold), then flow 700 proceeds to block 730. Block 730 comprises determining whether the packet is eligible for redistribution. Block 730 may comprise, for example, executing move-eligibility logic such as logic 500. Or, block 730 may comprise evaluating any other suitable move-eligibility criteria. If, in block 730, it is determined that the packet is not redistributable, then flow 700 proceeds to block 745. Otherwise, flow 700 proceeds to block 735.

Block 735 comprises identifying a secondary or other alternative path for the packet. For instance, block 735 may be executed by an alternative path candidate selection mechanism such as one of candidate selection logics 310b-n. Block 735 may comprise selecting a path from the same group using a different selection mechanism (e.g. a different hash function), and/or selecting a path from a different group of paths associated with the packet (e.g. a set of non-optimal paths to the destination address of the packet).

Block 740 comprises determining whether the quality of the path selected in block 735 is above the threshold, in similar manner to block 725. More generally, block 740 involves ensuring that the path selected in block 735 is actually of high enough quality to make it worthwhile to redistribute the packet to this path. In an embodiment, the threshold is the same as in block 725. In an embodiment, the threshold is relative to primary path quality and/or any other paths that may also have been selected in other iterations of blocks 735/740.

If the path selected in block 735 is not of sufficient quality, then flow 700 may return from block 740 to block 735 for selection of additional alternative paths, if other selection mechanisms are still available. Or, if other selection mechanisms are not available, flow 700 may proceed from block 740 to block 745, in which the packet is assigned to the primary path.

However, if the path selected in block 735 is of sufficient quality, then flow proceeds from block 740 to block 750. Block 750 comprises assigning the packet to the secondary or other alternative path selected in block 735. Flow then proceeds to block 755, which is described above.

Flow 700 illustrates only one of many possible flows for assigning a path to a packet. Other flows may include fewer, additional, or different elements, in varying arrangements. For example, flow 700 may omit block 725 or block 730. As another example, flow 700 may omit block 740 for some or all alternative paths.

As another example, in an embodiment, the quality of a path may be in any of a number of states, such as good, average, degraded, and congested. Flow 700 may decide which path to select based on a more sophisticated decision tree that takes these multiple states into account. For instance, flow 700 may involve selecting a primary path if the primary path is in a degraded state while a secondary path is congested, but selecting the secondary path if the secondary path is in a good state while the primary path is average or degraded. In such an embodiment, the more general inquiry of block 725 would be whether the state of the primary path is low in quality relative to the states of other paths.

Flow 700 illustrates a serial selection flow, in which selection mechanisms are executed in a sequence. However, in other embodiments, blocks 720 and 735 may be executed in parallel, and the decision steps of flow 700 determine which selection mechanism's selected path should be assigned to the packet.

5.2. Determining Move-Eligibility

Figure 8:
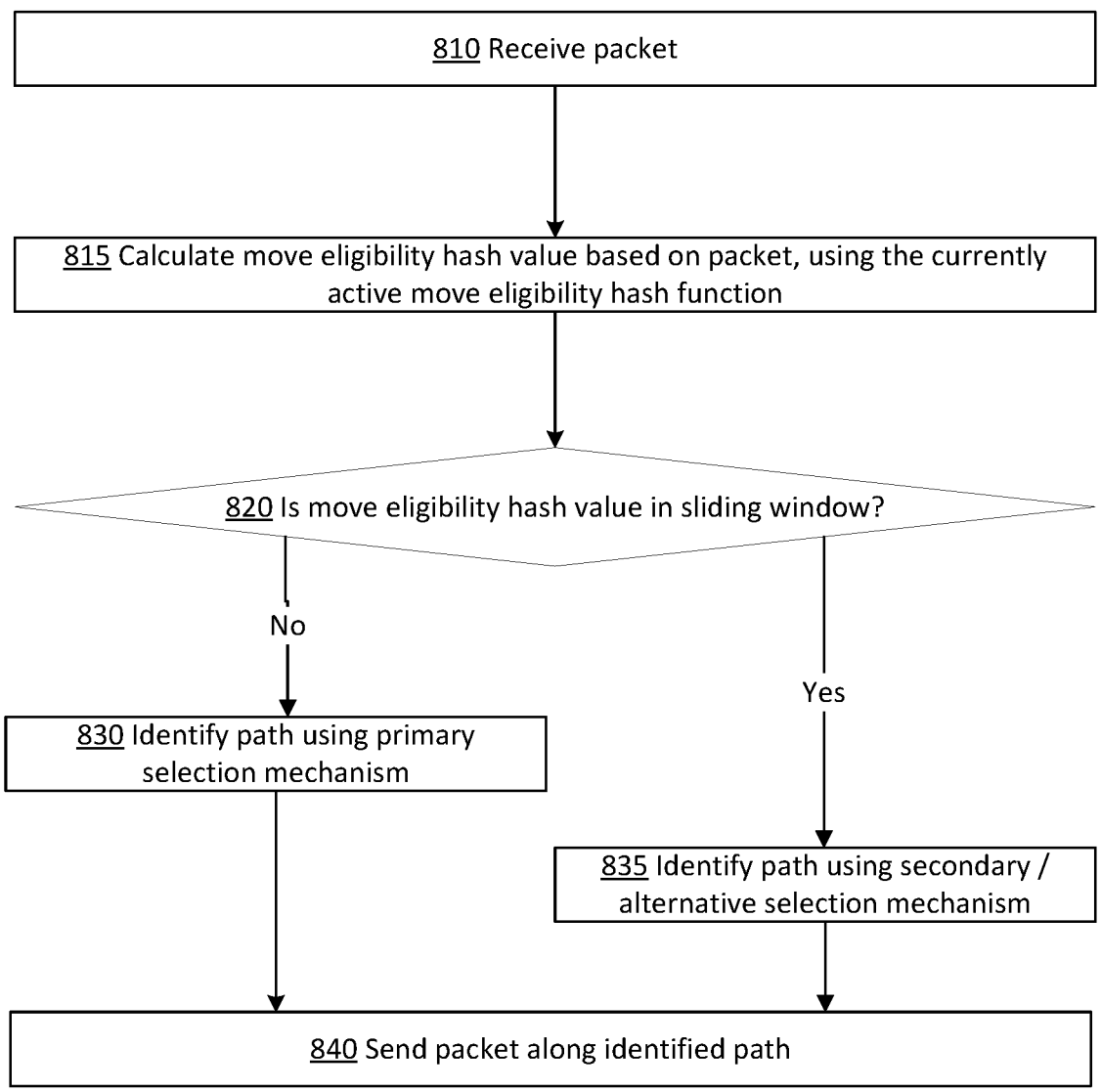
FIG. 8 illustrates an example flow for determining whether a packet is redistributable.

FIG. 8 illustrates an example flow 800 for determining whether a packet is redistributable, or "move-eligible," according to an embodiment. The various elements of flow 800 may be performed in a variety of systems, including systems such as system 100 and/or 200 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 810 comprises receiving a packet, such as a packet 205. In an embodiment, receiving the packet need not necessarily comprise receiving input that includes all of the packet. Rather, receiving the packet may comprise receiving an input indicating where the packet, or relevant information associated with the packet, is stored. Or, receiving the packet may comprise receiving key information associated with the packet, such as packet information 505.

Block 815 comprises calculating a move-eligibility hash value based on the packet, using the currently active move-eligibility hash function. In an embodiment with only one move-eligibility hash function, block 815 simply comprises executing that hash function on key information from the packet, as described in other sections. In embodiments where different move-eligibility hash functions may be active at different times, block 815 may further comprise identifying the currently active hash function for the group associated with the packet by performing, or reading the results from previously performing, flow 900, which is discussed in the next section.

Block 820 comprises determining whether the move-eligibility hash value calculated in bock 815 is within the sliding window of move-eligible values. The window may be a range or other set of hash values. In an embodiment, block 820 may further comprise locating information indicating which sliding window should be used for the group associated with the packet. Note that a background process may update the sliding window over time, based on collected state information, as described in other sections.

If the move-eligibility hash value calculated in block 815 is not within the sliding window of move-eligible values, then flow 800 proceeds to block 830, which comprises identifying the path to assign using a primary path selection mechanism, such as described in other sections. Otherwise, flow 800 proceeds to block 835, which comprises identifying the path to assign using a secondary or other alternative selection mechanism, such as described in other sections. Block 840 then comprises sending the packet along the assigned path, as described with respect to block 755 of FIG. 7.

Flow 800 illustrates only one of many possible flows for determining whether a packet is redistributable. Other flows may include fewer, additional, or different elements, in varying arrangements. For example, flow 800 assumes that no path state information is considered when assigning a path. In embodiments where path state information is considered, flow 800 would require a more complex decision tree. For instance, block 835 may be conditioned upon additional criteria beyond the move-eligibility hash value being within the sliding window of move-eligible values. Flow 800 may thus involve analyzing path state information to determine whether the quality of any selected secondary and/or alternative path is good enough to warrant redistributing the packet from the path that would be selected by the primary path selection mechanism. This may even necessitate performing block 830 before performing block 835 so as to allow for comparison to the state of the primary path.

Moreover, flow 800 assumes that only a single alternative selection mechanism is available. However, flow 800 may be expanded to include a decision tree in which block 820 decides between any number of additional selection mechanisms, each associated with a different sliding window. Or, block 835 may comprise a decision tree in which multiple selection mechanisms are considered.

In an embodiment, blocks 810-820 of flow 800 are an example of steps whereby move-eligibility logic such as block 500 may perform block 730 of FIG. 7. In yet other embodiments, flow 800 may be performed in other contexts.

5.3. Selecting a Move-Eligibility Hash Function

Figure 9:
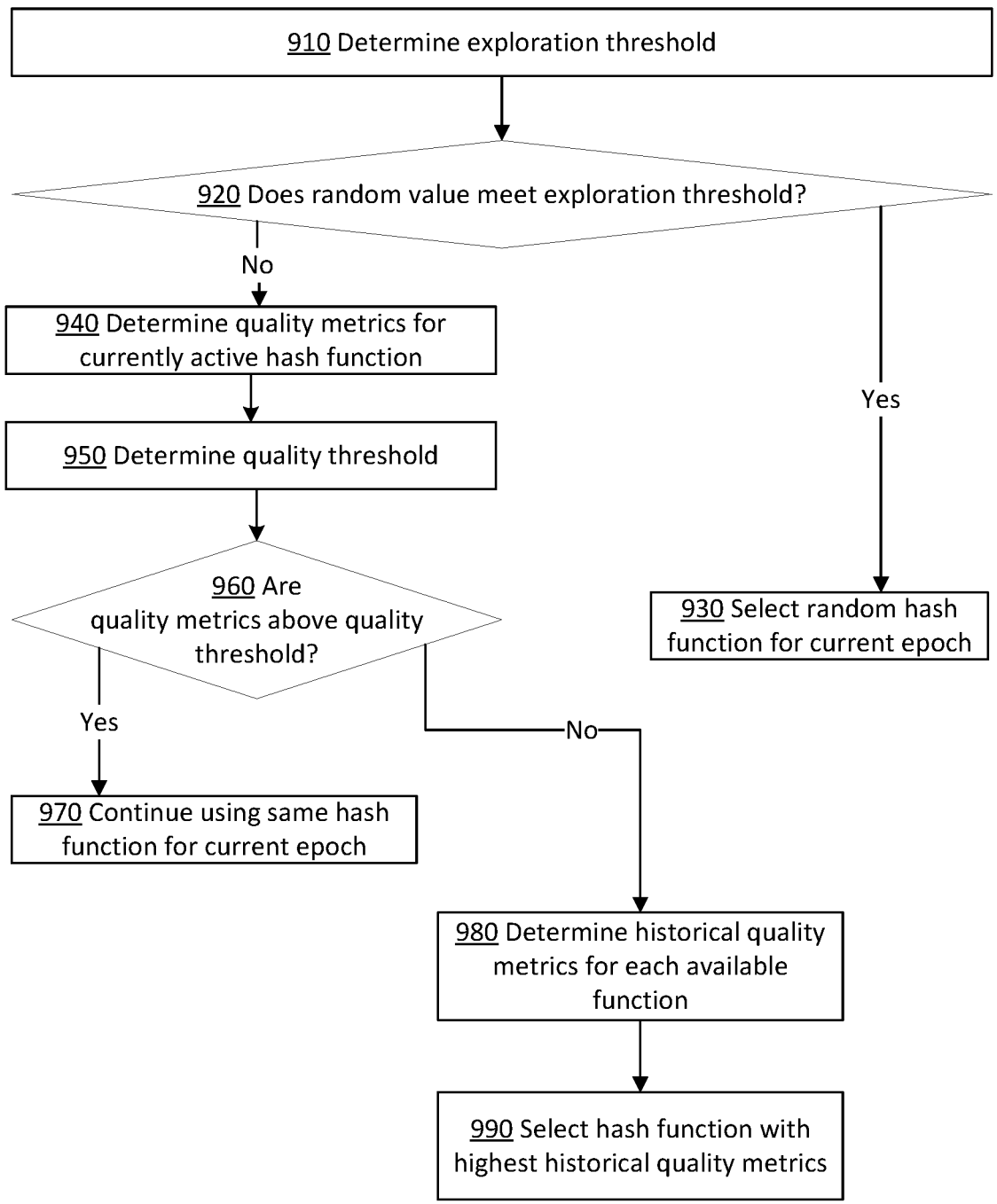
FIG. 9 illustrates an example flow for selecting a hash function to use for determining move-eligibility.

FIG. 9 illustrates an example flow 900 for selecting a hash function to use for determining move-eligibility, according to an embodiment. The various elements of flow 900 may be performed in a variety of systems, including systems such as system 100 and/or 200 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Flow 900 may be initiated at various times, depending on the embodiment, to select the active hash function to use for a move-eligibility mechanism. For instance, flow 900 may be initiated any time a move-eligibility decision is made, so as to identify the active hash function for the decision. Or, flow 900 may be initiated by a background process at the start or end of an epoch.

Block 910 comprises determining an exploration threshold. This may involve, for example, calculating the exploration threshold as a function of path state information and/or how long the implementing device has been operating since last reset, such that the exploration threshold decreases the longer the device has been operating and/or the better the collective quality states of the paths known to the device.

Block 920 comprises determining whether a randomly calculated value meets the exploration threshold. If so, then in block 930, a random hash function is activated. Hence, more generally, block 920 comprises determining whether a random path should be selected for learning purposes. Comparing a random number with the exploration threshold controls the average frequency with which a random path is selected over multiple iterations of flow 900. In another embodiment, rather than comparing a random number to the threshold, a count may be kept indicating how many iterations have lapsed since a random path was selected. If the count exceeds the exploration threshold, a random path should be chosen.

If a random path is not to be selected, then flow proceeds from block 920 to block 940. Block 940 comprises determining quality metrics for the currently active hash function. The quality metrics indicate how well the hash function is performing. The metrics may be calculated based on statistics logged over a recent period of time, such as, without limitation, during the previous epoch, during the period of time since the hash function most recently became active, during any time when the hash function has been active within the last ten minutes, and so forth. Example techniques for calculating a quality metric for a hash function are described in other sections.

Block 950 comprises determining a quality threshold. The threshold may be constant, or relative to quality metrics for other hash functions. Block 960 comprises determining whether the quality metrics are above the quality threshold. If so, then flow 900 proceeds to block 970, where the same hash function remains active for the current period of time.

Otherwise, flow 900 proceeds to block 980. In block 980, historical quality metrics are determined for each of the supported hash functions, in similar manner to the way quality metrics are calculated for the currently active hash function in block 940. Again, example techniques for calculating such metrics are described in other sections. Block 990 then comprises activating the hash function whose historical quality metrics are most optimal.

In an embodiment, once the active hash function has been selected, per one of blocks 930, 970, or 990, an indicator of the active hash function may be written to some memory, so that subsequent iterations of the move-eligibility mechanism may identify the active hash function without having to execute flow 900. Flow 900 thus only needs to be repeated at the expiration of the current epoch (e.g. upon ending the epoch, starting the next epoch, etc.). In another embodiment, flow 900 may be repeated each time the move-eligibility mechanism identifies the active hash function.

In an embodiment, flow 900 is repeated for each destination/group known to the implementing device, such that different groups may have different hash functions. In such an embodiment, quality metrics are calculated relative to the group for which the active hash function is being selected.

Flow 900 illustrates only one of many possible flows for selecting the currently active hash function. Other flows may include fewer, additional, or different elements, in varying arrangements. For instance, in an embodiment, the decision tree of flow 900 may be arranged differently, such that the same decisions are made but in a different order.

In an embodiment, if a hash function has not been active for a sufficiently long enough period of time for the system to have learned anything about how the hash function performs (e.g. if it has only been active for less than a threshold amount of time, or if only minimal activity has been logged while the hash function is active), then flow 900 may bypass blocks 920 and 960, and simply keep using the same hash function.

5.4. Example Use of a Redistribution Policy Engine

Figure 11:
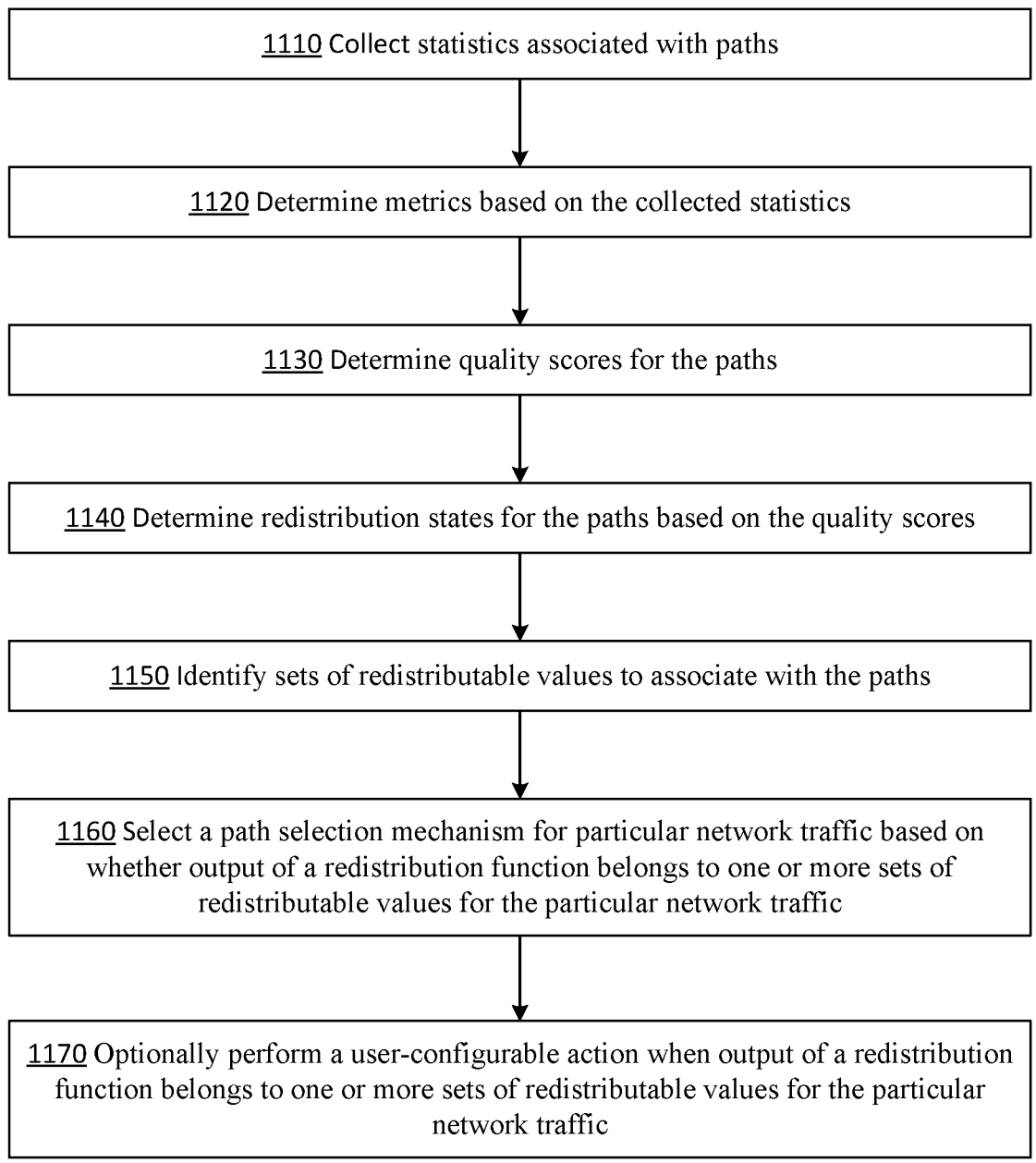
FIG. 11 illustrates an example flow for assigning paths in a system that comprises a redistribution policy engine.

FIG. 11 illustrates an example flow 1100 for assigning paths in a system that comprises a redistribution policy engine, such as redistribution policy engine 1000, according to an embodiment. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

According to an embodiment, flow 1100 is performed in conjunction with other example flows described herein. For instance, flow 1100 may be performed by a system that performs flows 700 and/or 800 many times over a period of time. In other embodiments, flow 1100 may be performed without necessarily performing other flows described herein.

Block 1110 comprises collecting statistics associated with paths to network destinations. Each path includes at least a particular egress port and a particular destination. Example statistics are described elsewhere herein.

Block 1120 comprises determining metrics based on the collected statistics, again as described elsewhere herein. Metrics may be determined for individual paths to a destination and/or for groups of paths to the destination, such as a primary group of optimal paths to the destination, or an alternate group of paths to the destination.

Block 1130 comprises determining quality scores for the paths, such as the individual path quality values and group path quality values described elsewhere herein.

Block 1140 comprises determining redistribution states for the paths based on the quality scores. In an embodiment, the redistribution states are numbers that are a function of the quality values and one or more redistribution states from previous epochs. Any other suitable mechanism for mapping quality values to redistribution states may be utilized.

Block 1150 comprises identifying sets of redistributable values to associate with the paths. A different set of redistributable values may be associated with each path to each destination. Additionally, or instead, a different set of redistributable values may be associated with each group of paths to each destination, such as with the primary path group, alternate path group, and so forth. Block 1150 is repeated any number of times. For instance, a determination may be made for all paths and/or path groups at the start of each epoch, at any time the set for a path or group of paths is needed, or once per epoch when needed.

Each set of redistributable values is selected from a superset of the possible output values of a redistribution function that is to be utilized in selecting whether to redistribute traffic. The set of redistributable values for a given path or group may be selected based on the redistribution state of the path or group. The redistribution state may directly indicate which values to include in the set, or simply indicate the size of the set (e.g. a percentage or other amount of the possible output values). In an embodiment, the set of redistributable values should be selected in such a manner that the values remain mostly consistent as the size of the set changes over time, to avoid changing the distribution of traffic too rapidly as redistribution sets grow. Any mechanism for selecting the values may be utilized. Example mechanisms for selecting the set include, without limitation, redistribution buckets, profiles, bitmaps, ranges, and so forth.

Block 1160 comprises selecting a path selection mechanism for particular network traffic based on whether output of a redistribution function belongs to one or more sets of redistributable values for the particular network traffic. Path selection mechanisms may include, for instance, any of the path candidate selection mechanisms described herein. The redistribution function may be any suitable function that produces an output within the range of possible redistributable values, such as a redistribution hash function.

For instance, if output of a redistribution function for a primary group of paths to the destination of the particular network traffic falls within the set of redistributable values currently associated with the primary group, an alternate path selection mechanism is selected for determining the path to assign to the particular network traffic. Additionally, or instead, if a primary path selection mechanism selects a primary path for the particular network traffic, but the output of the redistribution function (or a different redistribution function) for the primary path falls within the set of redistributable values currently associated with the path, an alternate path selection mechanism is selected for determining the path to assign to the particular network traffic.

Block 1160 may be repeated for all traffic processed by a system, only for traffic to certain destinations, and/or only for traffic that meets other conditions, such as being assigned to a congested primary path or path group.

In an embodiment, each of the redistributable values corresponds to a different set of one or more traffic flows to redistribute. Hence, determining the percentage or amount of redistributable values is, in essence, a way to determine a percentage or amount of the traffic flows to redistribute. This is because the redistribution function will be executed against information that is the same for any given message in the traffic flow, such as information in packet headers such as described elsewhere herein. Hence, the output of the redistribution function will be the same for any message in the traffic flow. Hence, each possible output value uniquely corresponds to one or more different traffic flows.

Block 1170 comprises optionally performing a user-configurable action when output of a redistribution function belongs to one or more sets of redistributable values for the particular network traffic. The user configurable action may be any suitable action, such as annotating the particular network traffic, updating related statistics based on the particular network traffic, performing a debugging operation, and so forth.

The various blocks of flow 1100 may be performed concurrently with each other, such that redistribution states, redistributable values, and so forth are adjusted concurrently with the processing of traffic over time. Flow 1100 illustrates only one of many possible flows for utilizing a redistribution policy engine. Other flows may include fewer, additional, or different elements, in varying arrangements. For instance, in an embodiment, blocks 1110-1130 may be omitted, and the redistribution states may be determined based on user input or other factors. In another embodiment, block 1140 may be omitted, and the quality scores may instead be utilized as redistribution states. In yet other embodiments, the sets of redistributable values may be determined directly based on the metrics determined in block 1120.

Figure 12:
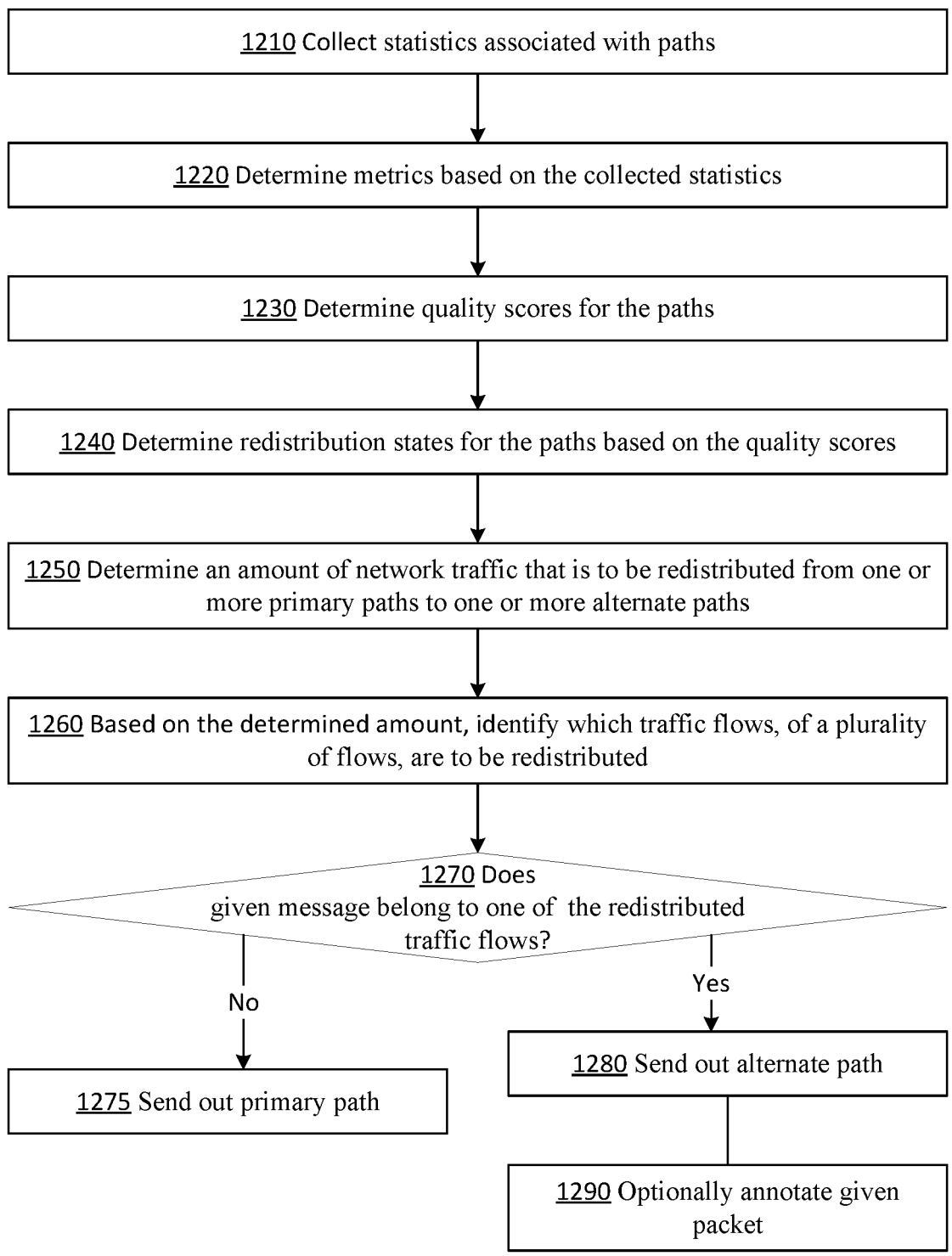
FIG. 12 illustrates another example flow for assigning paths in a system that comprises a redistribution policy engine.

FIG. 12 illustrates another example flow 1200 for assigning paths in a system that comprises a redistribution policy engine, such as redistribution policy engine 1000, according to an embodiment. According to an embodiment, flow 1200 offers a different view of steps that may be performed to implement flow 1100. In other embodiments, flow 1200 may be performed independently of flow 1100.

Block 1210 comprises collecting statistics associated with paths to network destinations, in similar manner to block 1110 above. Block 1220 comprises determining metrics based on the collected statistics, in similar manner to block 1120 above. Block 1230 comprises determining quality scores for the paths, in similar manner to block 1130 above. Block 1240 comprises determining redistribution states for the paths based on the quality scores, in similar manner to block 1140 above.

Block 1250 comprises determining an amount of network traffic, to a destination, that is to be redistributed from one or more primary paths to one or more alternate paths. For a given flow of traffic, the one or more primary paths may be, for example, a group of optimal paths, or a specific path to which a primary path selection mechanism would assign the traffic. Conversely, the one or more alternative paths may be a group of suboptimal paths, or any other group consisting of paths other than the specific path to which a primary path selection mechanism would assign the traffic.

In an embodiment, determining the amount may comprises identifying a percentage of the plurality of flows to redistribute based on the redistribution state. In another embodiment, determining the amount may comprise determining a number of flows to redistribute. The number may be determined directly, or via choosing buckets and/or profiles per block 1260. Block 1250 may be repeated for any number of destinations, paths, and/or groups of paths.

Block 1260 comprises, based on the determined amount, identifying which traffic flows, of a plurality of flows, are to be redistributed. In an embodiment, each traffic flow corresponds to a hash output of a redistribution hash function. Hence, like block 1150, block 1260 may comprise determining redistributable values. In other embodiments, the flows may be identified via other means, such as flow identifiers, header information, and so forth.

Block 1270 comprises, determining whether a given message belongs to one of the redistributed traffic flows. The given message may be a network packet, cell, or frame. In an embodiment, determining whether the given message belongs to one of the redistributed traffic flows comprises looking for flow identifying information in the header of the message, or otherwise associated with the message. In an embodiment, determining whether the given message belongs to one of the redistributed traffic flows comprises executing the redistribution hash function on information associated with the given message.

Block 1275 comprises, responsive to the given message not belonging to a redistributed traffic flow, sending the given message along a primary path to the destination. Conversely, block 1280 comprises, responsive to the given message belonging to a redistributed traffic flow, sending the given message along an alternative path to the destination instead of a primary path to the destination. The primary path to the destination is a path determined by a primary path selection mechanism for the network traffic, while the alternative path is a path determined by an alternative path selection mechanism, as described elsewhere herein.

Block 1290 comprises optionally annotating each given message determined to belong to one of the redistributed traffic flows. The annotating may comprise, for instance, inserting into the given message one or more of: a network node identifier, one or more metrics associated with the paths, or a count of a number of times the traffic has been redirected. Other actions may be performed instead of or in addition to annotating, such as debugging actions described elsewhere herein.

Blocks 1270-1290 may be repeated any number of times for any number of messages. In an embodiment, each given message for which the determining of whether the given message belongs to one of the redistributed traffic flows is performed is a message that a primary path selection mechanism assigns to a primary path that is determined to be congested. Moreover, flow 1200 may involve concurrently repeating the determining of the amount of network traffic to redistribute and the identifying of the redistributed traffic flows at intervals of time, thereby updating the redistributed traffic flows over time.

Like flow 1100, flow 1200 illustrates only one of many possible flows for utilizing a redistribution policy engine. Other flows may include fewer, additional, or different elements, in varying arrangements. For instance, in an embodiment, blocks 1210-1230 may be omitted, and the redistribution states may be determined based on user input or other factors. In another embodiment, block 1240 may be omitted, and the quality scores may instead be utilized as redistribution states. In yet other embodiments, the sets of redistributable values may be determined directly based on the metrics determined in block 1220.

6.0. EXAMPLE EMBODIMENTS

Examples of some embodiments are represented, without limitation, in the following clauses:

According to an embodiment, a method comprises assigning paths for traffic to a destination within a network using multiple path selection groups and collected path state information.

According to an embodiment, a method comprises identifying network traffic that would be routed to a primary path using primary path selection logic, applying move-eligibility criteria to identify a portion of that traffic that is eligible for movement to alternative paths, and assigning that portion of the traffic to the alternative paths.

According to an embodiment, a method comprises determining a destination for a packet within a network, selecting a primary path and at least one secondary path for the packet, from a primary group of paths for the destination, and utilizing collected path state information to select which of the primary path and the at least one secondary path to assign to the packet.

According to an embodiment, a method comprises utilizing collected path state information to assign paths for traffic to a destination within a network, the paths selected from a primary group of paths and an alternate group of paths.

According to an embodiment, a method comprises utilizing collected path state information to assign paths for traffic to a destination within a network, the paths selected from primary paths, secondary paths, and alternate paths.

According to an embodiment, a method comprises selecting a primary path, from a group of primary paths, for a packet to a destination within a network; determining whether the primary path is low quality; if the primary path is low quality, assigning the packet to a secondary path or an alternate path.

According to an embodiment, a method further comprises, if the group of primary paths is collectively of low quality, assigning the packet to an alternate path.

According to an embodiment, a method comprises: determining that a first network packet is to be sent to a destination; assigning the first network packet to a primary path selected by a primary path selection mechanism; sending the first network packet out a first network port associated with the primary path; determining that a second network packet is to be sent to the destination; determining that output of a function of information in the second network packet maps to a range of move-eligible values; responsive to determining that the second packet maps to the range of move-eligible values, assigning the second network packet to a different path selected by a different path selection mechanism than the primary path selection mechanism; sending the second network packet out a second network port associated with the different path.

According to an embodiment, a method comprises implementing a redistribution policy engine.

According to an embodiment, a method comprises determining whether to redistribute network traffic from a first path selected for the network traffic to one or more alternate paths based on comparing output from a redistribution hash function to redistribution buckets, the redistribution buckets determined from collected path state information.

According to an embodiment, a method comprises determining a destination for a network packet; identifying a group of network paths to the destination; based on information associated with the network packet, selecting, from the group of network paths, a primary path for sending the network packet to the destination; determining that the primary path is in a low-quality state; selecting a different path for sending the network packet to the destination; and, responsive to determining that the primary path is in a low-quality state, sending the network packet out a network port associated with the different path.

In an embodiment, the destination is a subnet to which a destination address specified by the network packet belongs.

In an embodiment, the information associated with the network packet includes one or more fields from a header of the network packet.

In an embodiment, the information associated with the network packet indicates a flow to which the network packet belongs.

In an embodiment, determining that the primary path is in the low-quality state comprises comparing a quality metric associated with the primary path to a quality threshold, the quality metric calculated based on one or more of: a measure of congestion or delay for one or more queues associated with a primary port that is associated with the primary path, or a measure of congestion or delay calculated based on information collected from packets annotated by one or more devices in the primary path.

In an embodiment, sending the network packet out the network port associated with the different path is further responsive to determining that the different path is in a higher quality state than the primary path.

In an embodiment, determining that the different path is in a higher quality state than the primary path comprises comparing a quality metric associated with the different path to the quality threshold.

In an embodiment, the group of network paths is a group of optimal paths to the destination, wherein selecting the different path comprises selecting the different path from a subset of paths in the group, the subset determined based on quality metrics associated with the paths in the group.

In an embodiment, selecting the primary path comprises calculating an index of an entry associated with the primary path in a primary table comprising the group of network paths, said calculating using a primary hash function of the information associated with the network packet, wherein selecting the different path comprises calculating an index of an entry associated with the different path in a secondary table comprising the subset of paths, using the primary hash function of the information associated with the network packet, or using a secondary hash function of the information associated with the network packet.

In an embodiment, the group of network paths is a group of optimal paths to the destination, wherein selecting the primary path comprises calculating a primary index associated with the primary path using a primary hash function of the information associated with the network packet, wherein selecting the different path comprises calculating a secondary index associated with the different path using a secondary hash function of the information associated with the network packet.

In an embodiment, the group of network paths is a group of optimal paths to the destination, wherein selecting the primary path and selecting the different path comprise calculating a primary index using a hash function of the information associated with the packet, wherein the primary index is associated with a data set that includes an identifier of the primary path and an identifier of the different path.

In an embodiment, the group of network paths is a group of optimal paths to the destination, wherein selecting the different path comprises: identifying an alternate group of paths to the destination, and selecting the different path from the alternate group.

In an embodiment, selecting the primary path comprises calculating an index of an entry associated with the primary path in a primary table comprising the group of optimal paths, said calculating using a primary hash function of the information associated with the network packet, wherein selecting the different path comprises calculating an index of an entry associated with the different path in an alternative table comprising the alternate group using the primary hash function of the information associated with the network packet or a secondary hash function of the information associated with the network packet.

In an embodiment, selecting a secondary path for sending the network packet to the destination, the secondary path selected from the group of network paths or a subset of the group of network paths, the secondary path different from the primary path; wherein sending the packet out the network port associated with the different path is further responsive to determining that the secondary path is in the low-quality state.

In an embodiment, sending the packet out the network port associated with the different path is further responsive to determining that the group of optimal paths is collectively in a low-quality state.

In an embodiment, sending the network packet out the network port associated with the different path is further responsive to determining that the network packet meets move-eligibility criteria.

In an embodiment, determining that the network packet meets move-eligibility criteria comprises determining that the network packet belongs to a flow that has been designated as redistributable.

In an embodiment, the network packet is a first packet, and the method further comprises: based on information associated with a second packet, selecting, from the group of network paths, the primary path for sending the second packet to the destination; responsive to determining that the primary path is no longer in the low-quality state, or responsive to determining that the second packet does not meet move-eligibility criteria, sending the second packet out a network port associated with the primary path.

In an embodiment, the packet is a first packet, and the method further comprises: based on information associated with a second packet, selecting, from the group of network paths, the primary path for sending the second packet to the destination; also selecting the different path for sending the second packet to the destination; responsive to determining that both the primary path and the different path are now in the low-quality state, sending the second packet out a network port associated with the primary path.

According to an embodiment, an apparatus comprises: forwarding logic configured to identify destinations for network packets; a path state management subsystem configured to collect statistics related to paths to the destinations, and to determine quality states of the paths based on the collected statistics; a path assignment subsystem configured to assign the network packets to the paths, the path assignment subsystem comprising: path group identification logic configured to identify groups of paths to the identified destinations; primary path candidate selection logic configured to select primary candidate paths, from the identified groups of paths, for sending the network packets to the destinations of the network packets; one or more alternative path candidate selection logics configured to select alternative candidate paths for sending certain packets to corresponding destinations of those certain packets; and path selection logic configured to select specific paths, of the primary candidate paths and the alternative candidate paths, to assign to specific packets of the network packets, based at least on specific quality states determined for corresponding primary candidate paths of the specific packets; and network communication interfaces configured to send the network packets to the identified destinations via the paths assigned to the network packets.

In an embodiment, the path selection logic is configured to assign a given packet to a primary candidate path selected for the given packet whenever the primary candidate path is not in a low-quality state; wherein the path selection logic is configured to assign a given packet to an alternative candidate path selected for the given packet on at least some occasions when the primary candidate path selected for the given packet is in a low-quality state.

In an embodiment, the path state management subsystem is configured to determine that a given path is in a low-quality state based on a comparison of a quality metric associated with the given path to a quality threshold, the quality metric calculated based on one or more of: a measure of congestion or delay for one or more queues associated with a primary port that is associated with the given path, or a measure of congestion or delay calculated based on information collected from packets annotated by one or more devices in the given path.

In an embodiment, the path selection logic is configured to assign a given packet to an alternative candidate path selected for the given packet only when the alternative candidate path is not in a low-quality state.

In an embodiment, the certain packets for which the one or more alternative path candidate selection logics are configured to select the alternative candidate paths are only those of the network packets whose corresponding primary path candidates are in a low-quality state.

In an embodiment, the one or more alternative path candidate selection logics are configured to select the alternative candidate paths for each of the network packets.

In an embodiment, the one or more alternative path candidate selection logics include a secondary path candidate selection logic; wherein, for each given packet of at least the certain packets, the primary path candidate selection logic is configured to select a primary candidate path from a group of optimal paths to a destination identified for the given packet, and the secondary path candidate selection logic is configured to select a secondary candidate path from a subset of paths in the group of optimal paths, the subset determined based on corresponding collected statistics for the optimal paths in the group.

In an embodiment, the primary path candidate selection logic is configured to select the primary candidate path for the given packet by calculating an index of an entry associated with the primary candidate path in a primary table comprising the group of optimal paths to the destination, said calculating using a primary hash function of information associated with the given packet; wherein secondary path candidate selection logic is configured to select the secondary candidate path by calculating an index of an entry associated with the secondary candidate path in a secondary table comprising the subset of paths, using the primary hash function of the information associated with the given packet, or using a secondary hash function of the information associated with the given packet.

In an embodiment, the one or more alternative path candidate selection logics include a secondary path candidate selection logic; wherein, for each given packet of at least the certain packets, the primary path candidate selection logic is configured to select a primary candidate path for the given packet by calculating a primary index associated with the primary candidate path using a primary hash function of information associated with the given packet, and the secondary path candidate selection logic is configured to select a secondary candidate path for the given packet using a secondary hash function of the information associated with the given packet.

In an embodiment, the one or more alternative path candidate selection logics include a secondary path candidate selection logic configured to select secondary candidate paths; wherein the primary path candidate selection logic and the secondary path candidate selection logic are both configured to select candidate paths for a given packet of at least the certain packets using a primary index calculated by a hash function of the information associated with the given packet, wherein the primary index is associated with a row in a path table that includes an identifier of a given primary candidate path and an identifier of a given secondary candidate path.

In an embodiment, the primary path candidate selection logic is configured to select the primary candidate paths from a primary path table; wherein the one or more alternative path candidate selection logics include a first alternative path candidate selection logic configured to select alternate candidate paths from an alternative path table that is different than the primary path table.

In an embodiment, the one or more alternative path candidate selection logics further include a secondary path candidate selection logic configured to select secondary candidate paths from the primary path table.

In an embodiment, the path selection logic is configured select alternative candidate paths instead of primary candidate paths for particular network packets whose selected primary candidate paths are in a low-quality state, responsive to determining that the particular network packets also meet move-eligibility criteria.

In an embodiment, the further comprises move-eligibility logic configured to determine that a given packet meets move-eligibility criteria by determining that the given packet belongs to a flow that has been designated as redistributable.

In an embodiment, the path assignment subsystem is implemented by one or more Field Programmable Gate Arrays and/or Application-Specific Integrated Circuits.

According to an embodiment, a method comprises assigning paths for sending network packets to a destination associated with the network packets, the network packets including particular network packets, the assigning including: executing a move-eligibility function with respect to each given packet of at least the particular network packets, the move-eligibility function outputting, for each given packet, a value calculated based on information associated with the given packet; responsive to the move-eligibility function outputting, with respect to first packets of the particular network packets, values that are not designated as move-eligible values, assigning each given packet of the first packets to a primary path selected based on the given packet by a primary path selection function; responsive to the move-eligibility function outputting, with respect to second packets of the particular network packets, values that are designated as move-eligible values, assigning the second packets to alternative paths instead of the primary path, each given packet of the second packets assigned an alternative path selected based on the given packet by a different path selection function than the primary path selection function; sending the network packets out network ports associated with their respectively assigned paths.

In an embodiment, the primary path selection function is configured to also select the primary path for the second packets.

In an embodiment, the method further comprises collecting path state information indicating quality states of paths to the destination, wherein assigning the second packets to alternative paths instead of the primary path is further responsive to determining that the primary path is in a low-quality state.

In an embodiment, the primary path selection function and each different path selection function each select a given path based on a given packet by calculating a hash value using a hash function on key information within the given packet, and by using the hash value to locate an entry within a table, the entry indicating the given path to select; wherein the primary path selection function and the different path selection function differ in at least one of: the hash function used to calculate their respective hash values, or the tables for which their respective hash values are used to locate the entry indicating the given path to select.

In an embodiment, the key information comprises one or more predefined fields in a header of the given packet.

In an embodiment, the move-eligibility function calculates the value to output for a given packet using a move hash function of the key information in the given packet, the move hash function used by the move-eligibility function being different than any hash function used by the primary path selection function and each different path selection function.

In an embodiment, the method further comprises increasing or decreasing the number of designated move-eligible values over time based on path quality state information associated with the paths to the destination.

In an embodiment, the method further comprises only changing the designated move-eligible values upon certain expirations of specific intervals of time, the designated move-eligible values otherwise remaining constant during any given one of the intervals.

In an embodiment, the intervals are each of predefined durations.

In an embodiment, the intervals are determined programmatically based on network traffic flows.

In an embodiment, the move-eligibility function calculates the value to output for a given packet using one of a plurality of move hash functions of the key information in the given packet, and the method further comprises: changing which move hash function of the plurality of move hash functions is used by the move-eligibility function upon certain expirations of specific intervals of time, the move hash function used by the move-eligibility function otherwise remaining constant during any given one of the intervals.

In an embodiment, the method further comprises: collecting path state statistics indicating the quality of different paths to the destination when the move-eligibility function utilizes particular move hash functions of the plurality of move hash functions; when the collected path state statistics indicate the different paths are collectively in a low-quality state, at the expiration of the next interval of time, changing the move hash function utilized by the move-eligibility function to a higher performing move hash function, as indicated by the collected path statistics.

In an embodiment, the method further comprises changing the move hash function to a random move hash function at the expirations of randomly selected intervals of time.

In an embodiment, the randomly selected intervals are randomly selected at, on average, a specific exploration frequency, the method further comprising changing the exploration frequency based on the collected path statistics.

According to an embodiment, an apparatus comprises: forwarding logic configured to identify destinations for network packets; a path assignment subsystem configured to assign paths for sending the network packets to the destinations, the path assignment subsystem comprising: primary path selection logic configured to select primary paths for sending packets to corresponding destinations of those packets; one or more alternative path selection logics configured to select alternative paths for sending packets to corresponding destinations of those packets; move-eligibility logic configured to identify certain packets that are eligible for redistribution, based on information indicating traffic flows to which the certain packets belong; and path assignment logic configured to select specific paths to assign to specific packets of the network packets, wherein the path assignment logic is further configured to assign first packets that are not eligible for redistribution to first paths selected by the primary path selection logic, and to assign second packets that are eligible for redistribution to second paths selected by the one or more alternative path selection logics; and network communication interfaces configured to send the network packets to the identified destinations via the paths assigned to the network packets.

In an embodiment, the apparatus further comprises: a path state management subsystem configured to collect path state information indicating quality states of the paths; wherein the path assignment logic is configured to assign the second packets to the second paths selected by the one or more alternative path selection logics responsive to determining that the primary paths selected by the primary path selection logic for the second packets are in low-quality states, wherein at least one of the first paths is also in a low-quality state when assigned to one of the first packets.

In an embodiment, the primary path selection logic and the one or more alternative path selection logics are each configured to select a given path for a given packet by calculating a hash value using a hash function on key information within the given packet, and by using the hash value to locate an entry within a table, the entry indicating the given path to select; wherein the primary path selection function and the one or more alternative path selection logics differ in at least one of: the hash function used to calculate their respective hash values, or the tables within which their respective hash values are used to locate the entry indicating the given path to select.

In an embodiment, the move-eligibility logic identifies the certain packets that are eligible for redistribution using a move hash function of the key information in the given packet, the move hash function used by the move-eligibility function being different than any hash function used by the primary path selection logic and the one or more alternative path selection logics.

In an embodiment, the move-eligibility logic is configured to determine whether a given packet is eligible for redistribution by executing a move hash function on key information in the given packet and determining whether a hash value output by the move hash function based on the key information is within a set of designated move-eligible values; wherein the move-eligibility logic is further configured to adjust the designated move-eligible values over time based on path quality state information associated with the paths to the destination, the designated move-eligible values changing in number over time.

In an embodiment, the move-eligibility logic is further configured to only change the designated move-eligible values upon certain expirations of specific intervals of time, the designated move-eligible values otherwise remaining constant during any given one of the intervals.

In an embodiment, the move-eligibility logic is configured to determine whether a given packet is eligible for redistribution by executing a move hash function on key information in the given packet and determining whether a hash value output by the move hash function based on the key information is within a set of designated move-eligible values; wherein the move-eligibility logic is further configured to select the move hash function from a plurality of move hash functions, the move hash function used for packets forwarded to a given destination being re-selected upon expirations of specific intervals of time, the move hash function used by the move-eligibility function remaining constant for the given destination during any given one of the intervals.

In an embodiment, the apparatus further comprises: a path state management subsystem configured to collect path state statistics indicating the quality of different paths to different destinations when the move-eligibility function utilizes particular move hash functions of the plurality of move hash functions; wherein the move-eligibility logic is further configured to, when the collected path state statistics indicate the different paths to a certain destination are collectively in a low-quality state, at the expiration of the next interval of time, change the move hash function for packets forwarded to the certain destination to a higher performing move hash function, as indicated by the collected path statistics.

In an embodiment, the move-eligibility logic is further configured to change the move hash function used for packets forwarded to a given destination to a random move hash function at the expirations of randomly selected intervals of time.

In an embodiment, the randomly selected intervals are randomly selected at, on average, a specific exploration frequency, the move-eligibility logic further configured to change the exploration frequency based on the collected path statistics.

According to an embodiment, a method comprises: receiving a plurality of input keys over a period of time; for each input key of the input keys, executing at least a currently active hash function of a plurality of hash functions on the input key, using a result value of the executing to locate a value mapped to the key, and outputting the located value; collecting statistics indicating a quality of performance of a system into which each located value is output; changing which hash function, of the plurality of hash functions, is currently active at various intervals during the period of time, said changing including: at first intervals, selecting a random hash function from the plurality of hash functions, and at second intervals, selecting a more optimal hash function from the plurality of hash functions, as indicated by collected statistics.

In an embodiment, changing which hash function is currently active further comprises: at third intervals, responsive to detecting that the currently active hash function is performing above a threshold level, as indicated by the collected statistics, keeping the currently active hash function as the currently active hash function.

In an embodiment, changing which hash function is currently active further comprises only changing the currently selecting hash function at predefined intervals.

In an embodiment, each outputted value indicates a decision with respect to forwarding of a network packet from which the respective input key was derived.

According to an embodiment, a system comprises: a redistribution bucket manager configured to identify sets of redistributable values to associate with paths to network destinations; and a traffic distribution function manager configured to select between multiple functions for determining how to distribute network traffic amongst the paths, the traffic distribution function manager selecting a given function for given network traffic based on whether output of a redistribution function belongs to a given set of redistributable values, of the sets of redistributable values, that is associated with one or more primary paths for a destination of given network traffic.

In an embodiment, each of the paths includes an egress port and a destination.

In an embodiment, the given network traffic comprises one or more packets.

In an embodiment, for the given network traffic, the output of the redistribution function is determined based on inputting given information associated with the given network traffic, the given information indicating a traffic flow to which the given network traffic belongs; wherein the sets of redistributable values indicate traffic flows, associated with the paths, that are redistributable to alternate paths or groups of paths.

In an embodiment, first sets of the sets of redistributable values are associated with groups of paths, each of the first sets associated with a different group of the paths, the one or more primary paths being one of the groups of paths.

In an embodiment, the one or more primary paths is a particular primary path to which a primary function of the multiple functions assigns the given network traffic.

In an embodiment, second sets of the sets of redistributable values are uniquely associated with individual paths, the traffic distribution function manager selecting the given function for the given network traffic further based on whether second output of the redistribution function, or of a second redistribution function, belongs to a particular second set of redistributable values, of the sets of redistributable values, that is associated with a particular primary path to which a primary function of the multiple functions assigns the given network traffic.

In an embodiment, the system further comprises: a path monitor configured to determine one or more metrics for the paths, based on statistics collected in association with the paths; wherein the redistribution bucket manager is configured to determine sizes of the sets based on the one or more metrics.

In an embodiment, the one or more metrics include one or more of: a port loading metric, a port delay metric, a queue delay metric, a queue length metric, a port length metric, or a path imbalance metric.

In an embodiment, the system further comprises: a quality classification component configured to determine quality scores for the paths, based on the one or more path metrics; a redistribution state manager configured to determine redistribution states for the paths based on the quality scores; wherein the redistribution bucket manager is configured to determine the sizes of the sets based on the redistribution states.

In an embodiment, the redistribution state manager is configured to determine redistribution states for a current period of time based on quality scores from a plurality of recent periods of time.

In an embodiment, the redistribution state manager is configured to update the redistribution states of the paths at specific intervals of times.

In an embodiment, the redistribution bucket manager is configured to update the sets of redistributable values at intervals based on the collected statistics.

In an embodiment, identifying a given set of the redistributable values comprises identifying a range of values of a particular size and calculating the given set by applying a transformation function on the range of values.

In an embodiment, identifying the sets of redistributable values to associate with the paths comprises identifying profiles to assign to the paths, the profiles indicating the sets of redistributable values.

In an embodiment, the multiple functions are different hash functions whose outputs are mapped to different ones of the paths, each of the different hash functions outputting, for at least particular network traffic, a value that is mapped to a different path than for each other of the different hash functions, wherein the redistribution function is also a hash function.

In an embodiment, the system further comprises: a debugging unit configured to perform one or more additional actions to perform with respect to traffic for which the output of a redistribution function belongs to a corresponding set of redistributable values.

According to an embodiment, a method comprises determining an amount of network traffic, to a destination, that is to be redistributed from one or more primary paths to one or more alternate paths; based on the determined amount, identifying which traffic flows, of a plurality of flows, are to be redistributed; for each given message of a plurality of messages, determining whether the given message belongs to one of the redistributed traffic flows, and, responsive to the given message belonging to a redistributed traffic flow, sending the given message along an alternative path to the destination instead of a primary path to the destination.

In an embodiment, each given message is a network packet, cell, or frame.

In an embodiment, the primary path to the destination is an optimal path, and the alternative path is a suboptimal path.

In an embodiment, the primary path to the destination is a path determined by a primary path selection mechanism for the network traffic, wherein the alternative path is a path determined by an alternative path selection mechanism.

In an embodiment, determining the amount comprises identifying a percentage of the plurality of flows to redistribute based on one or more metrics associated with the one or more primary paths, the one or more metrics calculated based on statistics collected in association with the one or more primary paths, the one or more metrics including one or more of: a port loading metric, a port delay metric, a queue delay metric, a queue length metric, a port length metric, or a path imbalance metric.

In an embodiment, determining the amount and identifying the redistributed traffic flows comprises determining a redistribution state of the one or more primary paths and selecting a profile from a plurality of redistribution profiles based on the determined redistribution state, the profile indicating the redistributed traffic flows.

In an embodiment, each traffic flow corresponds to a hash output of a redistribution hash function, and wherein determining whether the given message belongs to one of the redistributed traffic flows comprises executing the redistribution hash function on information associated with the given message.

In an embodiment, the information includes one or more of a source address, destination address, source port, destination port, or message type.

In an embodiment, the method further comprises repeating the determining of the amount of network traffic to redistribute and the identifying of the redistributed traffic flows at intervals of time, thereby updating the redistributed traffic flows over time, wherein, at a given time, the determining of whether each given message belongs to one of the redistributed traffic flows is relative to a currently identified set of redistributed traffic flows.

In an embodiment, each given message for which the determining of whether the given message belongs to one of the redistributed traffic flows is performed is a message that a primary path selection mechanism assigns to a primary path that is determined to be congested.

In an embodiment, the method further comprises annotating each given message determined to belong to one of the redistributed traffic flows, the annotating comprising inserting into the given message one or more of: a network node identifier, one or more metrics associated with the paths, or a count of a number of times the traffic has been redirected.

According to an embodiment, an apparatus comprises hardware and/or software-based components configured to perform one or more of the above methods.

According to an embodiment, a system comprises one or more network devices configured to perform one or more of the above methods.

Other examples of these and other embodiments are found throughout this disclosure.

7.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though the foregoing techniques are described with respect to a hardware implementation, which provides a number of advantages in certain embodiments, it will also be recognized that, in another embodiment, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 13:
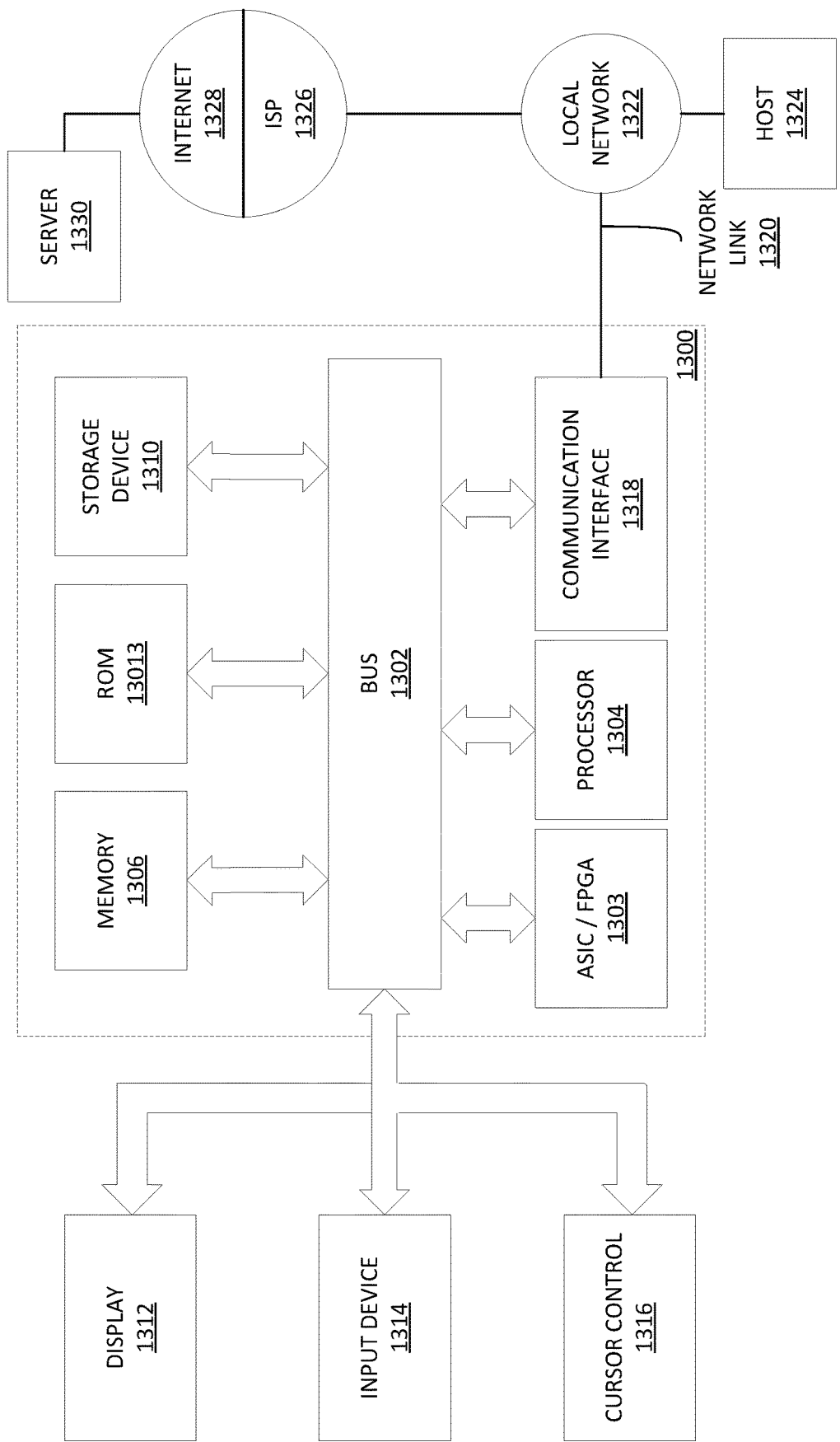
FIG. 13 is a block diagram of a computer system upon which embodiments of the inventive subject matter may be implemented.

FIG. 13 is a block diagram that illustrates a computer system 1300 that may be utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device.

Computer system 1300 may include one or more ASICs, FPGAs, or other specialized circuitry 1303 for implementing program logic as described herein. For example, circuitry 1303 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1300 may include one or more hardware processors 1304 configured to execute software-based instructions. Computer system 1300 may also include one or more busses 1302 or other communication mechanism for communicating information. Busses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes one or more memories 1306, such as a RAM, hardware registers, or other dynamic or volatile storage device for storing data units to be processed by the one or more ASICs, FPGAs, or other specialized circuitry 1303. Memory 1306 may also or instead be used for storing information and instructions to be executed by processor 1304. Memory 1306 may be directly connected or embedded within circuitry 1303 or a processor 1304. Or, memory 1306 may be coupled to and accessed via bus 1302. Memory 1306 also may be used for storing temporary variables, data units describing rules or policies, or other intermediate information during execution of program logic or instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, may optionally be provided and coupled to bus 1302 for storing information and instructions.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as a 1302.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 can send packets and receive data through the network(s), network link 1320, and communication interface 1318. In some embodiments, this data may be data units that the computer system 1300 has been asked to process and, if necessary, redirect to other computer systems via a suitable network link 1320. In other embodiments, this data may be instructions for implementing various processes related to the described techniques. For instance, in the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

Computer system 1300 may optionally be coupled via bus 1302 to one or more displays 1312 for presenting information to a computer user. For instance, computer system 1300 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

One or more input devices 1314 are optionally coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

As discussed, computer system 1300 may implement techniques described herein using customized hard-wired logic, one or more ASICs or FPGAs 1303, firmware and/or program logic, which in combination with the computer system causes or programs computer system 1300 to be a special-purpose machine. According to one embodiment, however, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

8.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components.

Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network apparatus comprising:
    a first network communication interface configured to receive a data unit;
    a path assignment subsystem comprising:
        a first candidate path selection logic configured to utilize a first function of information associated with the data unit to select, from a path table, a first path for sending the data unit;
        wherein selecting the first path comprises reading a first identifier of the first path at a first index in the path table, the first index outputted by the first function;
        a second candidate path selection logic configured to utilize a second function of the information associated with the data unit to select, from the path table, a second path for sending the data unit; and
        wherein selecting the second path comprises reading a second identifier of the second path at a second index in the path table, the second index outputted by the second function, and being different than the first index;
    path state management logic configured to determine that the first path is in a low-quality state;
    wherein the path assignment logic is further configured to, responsive to the determination that the first path is in the low-quality state, assign the data unit to the second path;
    a second communication interface associated with the second path and configured to transmit the data unit.

2. The network apparatus of claim 1,
    wherein the first function and the second function are a same function that outputs an index.

3. The network apparatus of claim 1, wherein the path table is an array or table comprising one or more entries for each path in a group of paths associated with the path table.

4. The network apparatus of claim 1, wherein the first function and the second function each comprise one or more of: a hash function, a checksum function, a cyclic redundancy check, or a modulo operation.

5. The network apparatus of claim 1, further comprising forwarding logic configured to, responsive to the path assignment logic assigning the data unit to the second path, forward the data unit to the second communication interface instead of a third communication interface that is associated with the first path.

6. The network apparatus of claim 1, wherein the first candidate path selection logic is implemented in parallel with the second candidate path selection logic.

7. The network apparatus of claim 1, wherein determining that the first path is in the low-quality state comprises comparing a quality metric associated with the first path to a quality threshold, the quality metric calculated based on one or more of: a measure of congestion or delay for one or more queues associated with the first path, or a measure of congestion or delay calculated based on information collected from data units annotated by one or more devices in the first path.

8. The network apparatus of claim 1, wherein determining that the first path is in the low-quality state comprises determining that a quality metric for a first group of paths in the first path table is below a particular threshold.

9. The network apparatus of claim 1, wherein assigning the data unit to the second path is further responsive to one or more of: determining that the data unit meets move-eligibility criteria, or determining that the second path is not in the low-quality state.

10. A method comprising:
    receiving a data unit via a first network communication interface of a network device;
    selecting, from a path table, a first path for sending the data unit, based on a first function of information associated with the data unit;
    wherein selecting the first path comprises reading a first identifier of the first path at a first index in the path table, the first index outputted by the first function;
    selecting, from the path table, a second path for sending the data unit, based on a second function of the information associated with the data unit;
    wherein selecting the second path comprises reading a second identifier of the second path at a second index in the path table, the second index outputted by the second function, and being different than the first index;
    determining that the first path is in a low-quality state;
    responsive to the determination that the first path is in the low-quality state, assigning the data unit to the second path;
    transmitting the data unit out a second communication interface of the network device that is associated with the second path responsive to the assigning of the data unit to the second path.

11. The method of claim 10,
    wherein the first function and the second function are a same function that outputs an index.

12. The method of claim 10, wherein the path table is an array or table comprising one or more entries for path in a group of paths associated with the path table.

13. The method of claim 10, wherein the first function and the second function each comprise one or more of: a hash function, a checksum function, a cyclic redundancy check, or a modulo operation.

14. The method of claim 10, wherein determining that the first path is in the low-quality state comprises comparing a quality metric associated with the first path to a quality threshold, the quality metric calculated based on one or more of: a measure of congestion or delay for one or more queues associated with the first path, or a measure of congestion or delay calculated based on information collected from data units annotated by one or more devices in the first path.

15. The method of claim 10, wherein determining that the first path is in the low-quality state comprises determining that a quality metric for a first group of paths in the first path table is below a particular threshold.

16. The method of claim 10, wherein assigning the data unit to the second path is further responsive to one or more of: determining that the data unit meets move-eligibility criteria, or determining that the second path is not in the low-quality state.

17. One or more non-transitory computer-readable media storing instructions that, when executed by one or more computing devices, cause performance of:

receiving a data unit via a first network communication interface of a network device;

selecting, from a path table, a first path for sending the data unit, based on a first function of information associated with the data unit;

wherein selecting the first path comprises reading a first identifier of the first path at a first index in the path table, the first index outputted by the first function;

selecting, from the path table, a second path for sending the data unit, based on a second function of the information associated with the data unit;

wherein selecting the second path comprises reading a second identifier of the second path at a second index in the path table, the second index outputted by the second function, and being different than the first index;

determining that the first path is in a low-quality state;

responsive to the determination that the first path is in the low-quality state, assigning the data unit to the second path;

transmitting the data unit out a second communication interface of the network device that is associated with the second path responsive to the assigning of the data unit to the second path.

* * * * *